(12) United States Patent
Jung et al.

(10) Patent No.: US 11,042,848 B2
(45) Date of Patent: Jun. 22, 2021

(54) ELECTRONIC DEVICE, SERVER AND CONTROL METHOD USING THE ELECTRONIC DEVICE

(71) Applicant: SAMSUNG ELECTRONICS CO., LTD., Suwon-si (KR)

(72) Inventors: Jae-ho Jung, Yongin-si (KR); Ji-hoon Park, Seoul (KR); Tae-wook Ahn, Suwon-si (KR); Won-jin Hur, Seoul (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 308 days.

(21) Appl. No.: 15/923,234

(22) Filed: Mar. 16, 2018

(65) Prior Publication Data

US 2018/0268384 A1    Sep. 20, 2018

Related U.S. Application Data

(60) Provisional application No. 62/472,687, filed on Mar. 17, 2017.

(30) Foreign Application Priority Data

Jul. 12, 2017 (KR) .................. 10-2017-0088662

(51) Int. Cl.
*G06Q 20/08* (2012.01)
*G06Q 20/32* (2012.01)
(Continued)

(52) U.S. Cl.
CPC ....... *G06Q 20/0855* (2013.01); *G06Q 20/325* (2013.01); *G06Q 20/405* (2013.01); *G06Q 20/42* (2013.01)

(58) Field of Classification Search
None
See application file for complete search history.

(56) References Cited

U.S. PATENT DOCUMENTS

2010/0121727 A1* 5/2010 Butler ................. G06Q 30/06
   705/26.1
2010/0312696 A1* 12/2010 Sinha .................. G06Q 40/06
   705/40

(Continued)

FOREIGN PATENT DOCUMENTS

KR   2006-0111200 A  * 10/2006  ............. G06Q 99/00
KR   10-2014-0066354 A   6/2014

(Continued)

OTHER PUBLICATIONS

"Payment Application Make E-Commerce Mobile" by Neal Leavitt published by IEEE on Dec. 1, 2010 in Computer Magazine, vol. 43, Issue: 12, pp. 19-22.*

(Continued)

*Primary Examiner* — Alexander G Kalinowski
*Assistant Examiner* — Blane A Lickteig
(74) *Attorney, Agent, or Firm* — Sughrue Mion, PLLC

(57) ABSTRACT

An electronic apparatus includes a communication interface, a memory storing instructions, and a processor. The memory stores instructions that cause the processor to control the communication interface to transmit, to a first server located outside the electronic device, a signal requesting the first server to create a virtual account for an external electronic device, based on identification information of the external electronic device and based on a split payment amount that is allocated to the external electronic device.

13 Claims, 17 Drawing Sheets

(51) Int. Cl.
    *G06Q 20/40*    (2012.01)
    *G06Q 20/42*    (2012.01)

(56) References Cited

U.S. PATENT DOCUMENTS

| | | | |
|---|---|---|---|
| 2011/0276476 A1* | 11/2011 | Kim | G06Q 20/26 |
| | | | 705/39 |
| 2012/0173396 A1 | 7/2012 | Melby et al. | |
| 2013/0060689 A1* | 3/2013 | Oskolkov | G06Q 20/10 |
| | | | 705/42 |
| 2014/0012749 A1* | 1/2014 | Lee | G06Q 20/10 |
| | | | 705/40 |
| 2016/0117667 A1* | 4/2016 | Kang | G06Q 20/42 |
| | | | 705/39 |
| 2017/0186015 A1 | 6/2017 | Jin et al. | |
| 2017/0193468 A1* | 7/2017 | Chougule | G06Q 20/223 |
| 2017/0228718 A1* | 8/2017 | Runyan | G06Q 20/322 |
| 2017/0337546 A1* | 11/2017 | Holmes | G06Q 20/36 |
| 2018/0225649 A1* | 8/2018 | Babar | G06Q 20/223 |

FOREIGN PATENT DOCUMENTS

| | | |
|---|---|---|
| KR | 10-2015-0080066 A | 7/2015 |
| KR | 10-2015-0082727 A | 7/2015 |
| KR | 10-1692158 B1 | 1/2017 |
| KR | 10-2017-0077425 A | 7/2017 |

OTHER PUBLICATIONS

Communication dated Jan. 23, 2019 by the International Searching Authority in counterpart International Patent Application No. PCT/KR2018/006980. (PCT/ISA/210, PCT/ISA/220 & PCT/ISA/237).
Communication dated May 26, 2020, from the European Patent Office in European Application No. 18832623.5.

* cited by examiner

ELECTRONIC DEVICE, SERVER AND CONTROL METHOD USING THE ELECTRONIC DEVICE

CROSS-REFERENCE TO RELATED APPLICATION(S)

This application claims priority from U.S. Provisional Application No. 62/472,687, filed on Mar. 17, 2017, in the U.S. Patent and Trademark Office, and Korean Patent Application No. 10-2017-0088662, filed on Jul. 12, 2017, in the Korean Intellectual Property Office, the entire disclosures of which are incorporated herein by reference in their entireties.

BACKGROUND

1. Field

Apparatuses and methods consistent with embodiments relate to an electronic device, a server, and a control method using the electronic device, and more particularly to a technique of making a split payment, using an electronic device.

2. Description of Related Art

Since various electronic devices such as a smart phone, a tablet personal computer (PC), a portable multimedia player (PMP), a personal digital assistant (PDA), a laptop PC, a wearable device, etc. have become popular, there is an increasing interest in technology for making mobile payments, using various electronic devices.

Mobile payment is advantageous in that payment may be made without having a separate credit card or check card, based on a characteristic that an electronic device is often carried by a user.

SUMMARY

According to embodiments, an electronic device includes a communication interface, a memory storing instructions, and a processor. The memory stores instructions that cause the processor to control the communication interface to transmit, to a first server located outside the electronic device, a signal requesting the first server to create a virtual account for an external electronic device, based on identification information of the external electronic device and based on a split payment amount that is allocated to the external electronic device.

The memory may store the instructions that further cause the processor to control the communication interface to transmit, to the first server, the signal requesting the first server to create the virtual account, using a payment application that is provided by the first server.

The virtual account may be created by the first server, based on an actual account that is owned by a user of the electronic device.

The virtual account may be created by the first server, based on an actual account that is owned by the first server.

The memory may store the instructions that further cause the processor to control the communication interface to transmit, to the first server, another signal requesting a second server located outside the electronic device to create the virtual account, based on the identification information of the external electronic device participating in a split payment and the split payment amount allocated to the external electronic device.

The memory may store the instructions that further cause the processor to control the communication interface to transmit, to the external electronic device, another signal requesting the identification information of the external electronic device, and based on receiving, from the external electronic device, the identification information of the external electronic device, control the memory to store the identification information that is received.

The electronic device and the external electronic device may use a same messenger application, and the memory may store the identification information of the external electronic device that is used in the same messenger application.

The electronic device may further include a display, and the memory may store the instructions that further cause the processor to, based on receiving, from the first server, a notification including an instruction configured to search for an application providing a remittance function or a payment function, control the display to display an execution screen of the application that is previously installed in the electronic device.

The electronic device may further include a display, and the memory may store the instructions that further cause the processor to, based on receiving, from the first server, a notification including an instruction configured to execute a website providing a remittance function or a payment function, control the display to display the website that is found by the electronic device.

According to embodiments, a server includes a communication interface, a memory storing instructions, and a processor. The memory stores instructions that cause the processor to create a virtual account for an electronic device, based on identification information of the electronic device participating in a split payment and based on a payment amount that is applied to the electronic device, and control the communication interface to transmit, to the electronic device, a split payment related notification including virtual account information of the virtual account.

According to embodiments, there is provided a control method using an electronic device, the method including completing a payment, using a payment application, starting a split payment, based on a user input, and transmitting, to a first server located outside the electronic device, a signal requesting the first server to create a virtual account for an external electronic device, based on identification information of the external electronic device participating in the split payment and based on a split payment amount that is allocated to the external electronic device.

The payment application may be provided by the first server, and the method may further include executing the payment application provided by the first server.

The control method may further include transmitting, to the first server, another signal requesting a second server located outside the electronic device to create the virtual account, based on the identification information of the external electronic device participating in the split payment and the split payment amount allocated to the external electronic device.

The control method may further include transmitting, to the external electronic device, another signal requesting the identification information of the external electronic device, and based on receiving, from the external electronic device, the identification information of the external electronic device, storing the identification information that is received.

The electronic device and the external electronic device may use a same messenger application, and the method may further include storing the identification information of the external electronic device that is used in the same messenger application.

The control method may further include, based on receiving, from the first server, a notification including an instruction configured to search for an application providing a remittance function or a payment function, displaying, on a display, an execution screen of the application that is previously installed in the electronic device.

The control method may further include, based on receiving, from the first server, a notification including an instruction configured to execute a website providing a remittance function or a payment function, displaying, on a display, the website that is found by the electronic device.

According to embodiments, there is provided a computer program product including a non-transitory computer readable recording medium including instructions to cause an electronic device to perform operations of completing a payment, using a payment application, starting a split payment, based on a user input, and transmitting, to a first server located outside the electronic device, a signal requesting the first server to create a virtual account for an external electronic device, based on identification information of the external electronic device participating in the split payment and based on a split payment amount that is allocated to the external electronic device.

According to embodiments, there is provided a control method using an electronic device, the method including completing a payment, using a payment application, in response to the payment being completed, controlling to display a function performing object for starting a split payment, in response to an input with respect to the function performing object that is displayed, controlling to display a candidate list including one or more users with which a user of the electronic device is able to perform the split payment, and based on a selection of one of the one or more users from the candidate list that is displayed, transmitting, to a first server external to the electronic device, a request to create a virtual account for the one of the one or more users to perform the split payment, wherein the request includes identification information of an external electronic device of the one of the one or more users and includes a split payment amount that is allocated to the one of the one or more users.

The control method may further include, based on the selection of the one of the one or more users from the candidate list that is displayed, controlling to display a total payment amount of the payment that is completed, along with a region for inputting the split payment amount, and the request to create the virtual account may be transmitted based on the split payment amount being inputted.

BRIEF DESCRIPTION OF THE DRAWINGS

The above and other aspects, features, and advantages of embodiments of the disclosure will be more apparent from the following description taken in conjunction with the accompanying drawings, in which.

DETAILED DESCRIPTION

Figure 1A:
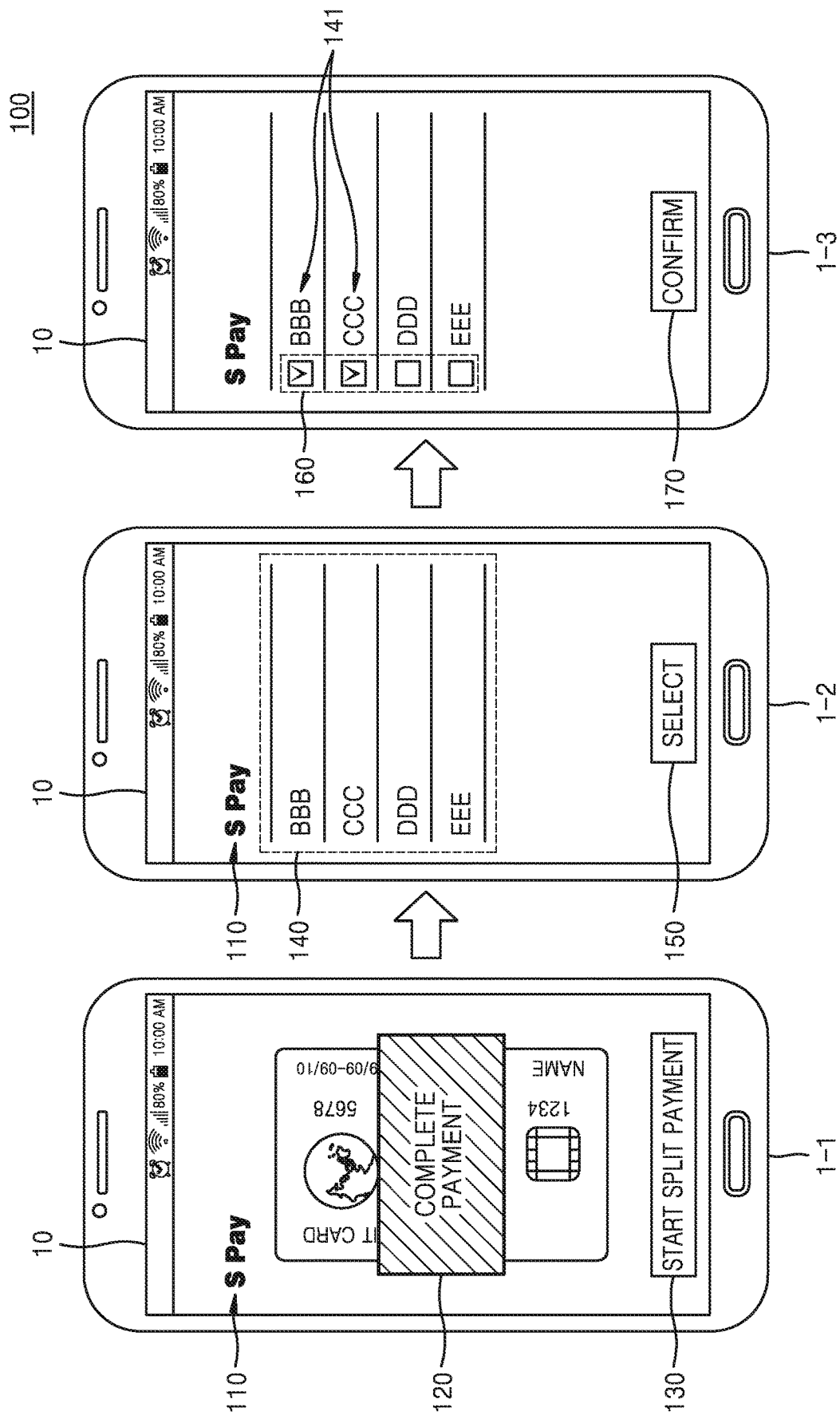
FIGS. 1A and 1B are diagrams for explaining a situation in which a split payment is made using an electronic device, according to embodiments.

Hereinafter, embodiments of the disclosure will be described with reference to the accompanying drawings. It may be understood that the embodiments and terminology used herein are not intended to limit the techniques described in the disclosure to the embodiments, but rather may be understood to include various modifications, equivalents, and/or alternatives of the embodiments. In the description of the drawings, like reference numerals may be used for similar elements. The singular expressions may include plural expressions unless the context clearly dictates otherwise. In the disclosure, the expressions "A or B" or "at least one of A and/or B" and the like may include all possible combinations of the items listed together. Expressions such as "first," "second," "first," or "second," and the like, may express their components irrespective of order or importance and may be used to distinguish one component from another but is not limited to those components. When it is mentioned that a (e.g., first) component is "(functionally or communicatively) connected" or "connected to" another (e.g., second) component, the component may be connected directly to the other component, or may be connected through another component (e.g., a third component).

In the disclosure, "configured to" used herein may be interchangeably used with "suitable to" in a hardware or software way, "having the ability to," "changed to," "made to," "able to," or "designed to" according to a situation. In some situations, the expression "a device configured to" may mean that the device may "be able to" with other devices or components. For example, the phrase "a processor configured to perform A, B, and C" may mean a dedicated processor (e.g., an embedded processor) for performing a corresponding operation or a general purpose processor (e.g., a central processing unit (CPU) or an application processor) capable of performing corresponding operations by executing one or more software programs stored in a memory device.

An electronic device in accordance with embodiments of the disclosure may include any one or any combination of, for example, a smart phone, a tablet personal computer (PC), a mobile phone, a videophone, an electronic book reader, a desktop PC, a laptop PC, a netbook computer, a workstation, a server, a personal digital assistant (PDA), a portable multimedia player (PMP), an MP3 player, a medical device, a camera, and a wearable device. The wearable device may include any one or any combination of an accessory type (e.g., a watch, a ring, a bracelet, a bracelet, a necklace, glasses, a contact lens or a head-mounted-device (HMD), a fabric or garment all-in-one type (e.g., an electronic apparel), a body attach type (e.g., a skin pad or a tattoo), and a bio-implantable circuit. In embodiments, the electronic device may include any one or any combination of, for example, a television, a digital video disk (DVD) player, an audio, a refrigerator, an air conditioner, a vacuum cleaner, an oven, a microwave oven, a washing machine, an air cleaner, a set top box, a home automation control panel, a security control panel, a media box (e.g., Samsung HomeSync™, Apple TV™, or Google TV™), a game console (e.g., Xbox™ PlayStation™), an electronic dictionary, an electronic key, a camcorder, and an electronic frame In another embodiment, the electronic device may include any one or any combination of a variety of medical devices (e.g., various portable medical measurement devices such as a blood glucose meter, a heart rate meter, a blood pressure meter, or a body temperature meter), magnetic resonance angiography (MRA), magnetic resonance imaging (MRI), computed tomography (CT), a camera, or an ultrasonic device, etc.), a navigation system, a global navigation satellite system (GNSS), an event data recorder (EDR), a flight data recorder (FDR), an automotive infotainment device, a marine electronic equipment (e.g., a marine navigation system, a gyro compass, etc.), avionics, a security device, a vehicle head unit, an industrial or domestic robot, a drone, an ATM at a financial institution, a point of sales (POS) of a shop, and an Internet of things (IoT) device (e.g., a light bulb, various sensors, a sprinkler device, a fire alarm, a temperature controller, a street light, a toaster, exercise equipment, a hot water tank, a heater, or a boiler etc.) According to embodiments, the electronic device may include any one or any combination of furniture, a part of building/structure or an automobile, an electronic board, an electronic signature receiving device, a projector, and a variety of measuring devices (e.g., water, electricity, gas, or a radio wave measuring instrument, etc.). In embodiments, the electronic device may be flexible or may be a combination of two or more of the various devices described above. The electronic device according to the embodiments of the disclosure is not limited to the above-mentioned devices.

The electronic device according to embodiments of the disclosure may be any one or more of the various electronic devices described above. The electronic device according to embodiments of the disclosure may also be a flexible device.

When the electronic device according to embodiments of the disclosure generates a magnetic field signal, the same current as when a magnetic card swiped a card reading device at a position of a header may be generated in the card reading device. That is, a user may allow a portable device to approach or contact the card reading device to pay for the cost or the like.

A magnetic field communication method may include near field communication (NFC) and marine secure transmission or near field magnetic stripe transmission (MST). These methods may differ in a data rate (bit/sec), a communication range and frequency. Also, NFC is bi-directional communication, whereas MST is uni-directional communication (e.g., information is transmitted from one side without ping).

In the disclosure, the term user may refer to a person who uses the electronic device or a device (e.g., an artificial intelligence electronic device) using the electronic device.

Upon making a mobile payment, using various electronic devices, a technique of making a split payment by splitting a payment amount between a plurality of users is being developed.

When a plurality of people make a split payment, a mobile payment is troublesome is a similar way to using a physical card in that it takes a long time to pay. For example, when three people make the mobile payment by splitting a payment amount, because each of the three people waits for his or her turn and makes the mobile payment for the split amount, using his/her own electronic device, an advantage of the mobile payment is reduced.

Furthermore, when one of users who intends to make the split payment makes the split payment as a representative, the remaining participants other than the representative may use a method of remitting a part of a payment amount allocated to the representative while making a settlement later. However, there is a disadvantage in that actual account information of the representative is exposed to the other participants.

Figure 1B:
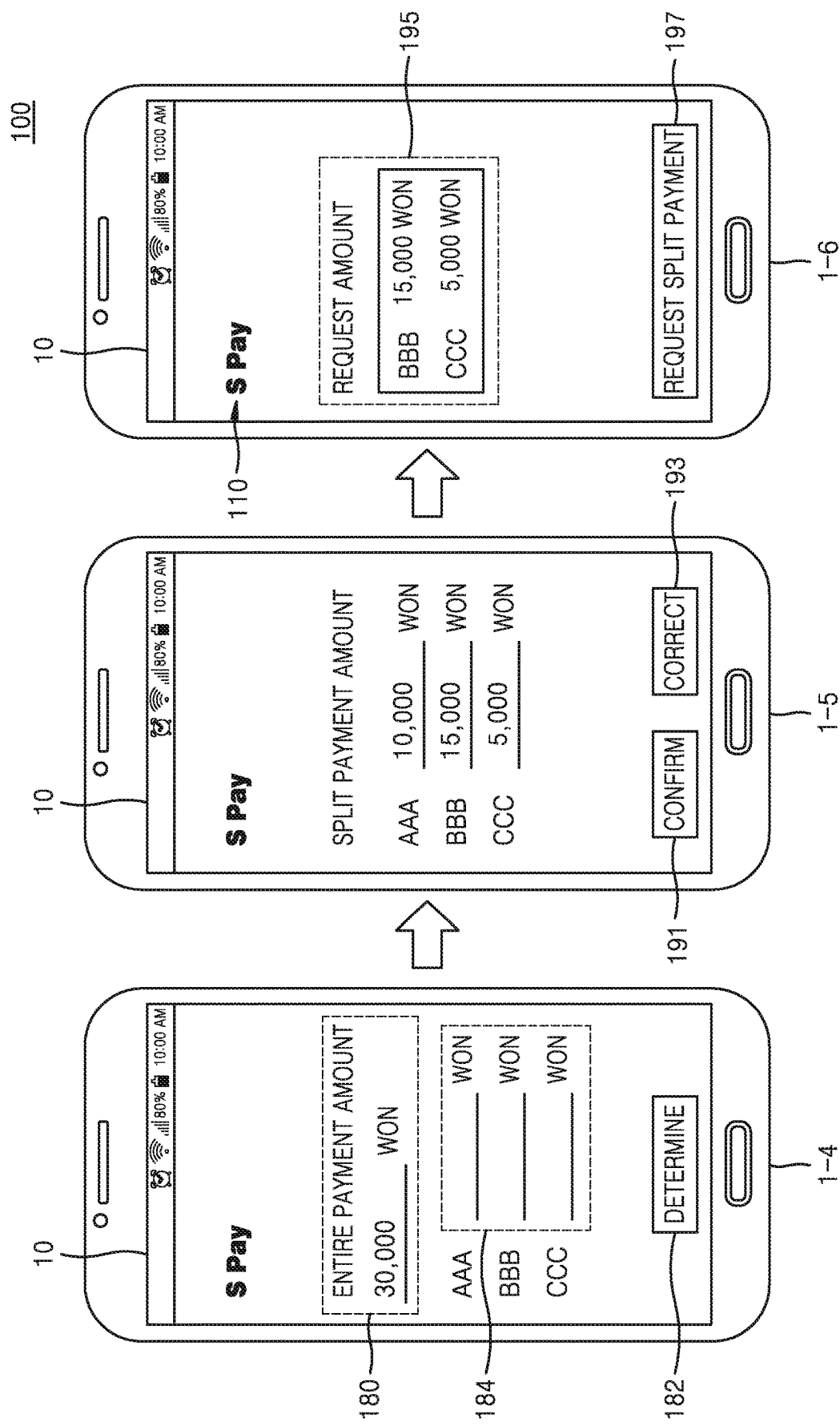

FIGS. 1A and 1B are diagrams for explaining a situation in which a split payment is made using an electronic device 100, according to embodiments.

The split payment may mean a method in which two or more users split a payment amount to pay. Upon making the split payment, an amount that a user has to pay may be designated equally for each user, and may be specified differently for each user. The payment amount designated for each user may be designated by an input of the user who makes the split payment. If the input of the user regarding a payment amount designation is not received, users participating in the split payment may be equally designated.

According to embodiments, upon making the split payment, users may split an entire payment amount and then proceed with respective payments. According to another embodiment, after one representative of the users proceeds with payment, the remaining users may transfer money to an account of the representative. Hereinafter, it is assumed that a representative user makes payment and then other users transfer money to an account of the representative user. However, the disclosure is not limited thereto.

Referring to 1-1 of FIG. 1A, the electronic device 100 according to embodiments may complete a payment using a payment application 110. The payment application 110 may include, for example, a Samsung Pay™ application. The payment application 110 may provide, for example, a user interface associated with payment. The payment application 110 may include a wallet UI/UX. For example, the payment application 110 may provide a user interface associated with a card registration, payment, or transaction.

According to embodiments, when the electronic device 100 completes the payment using the payment application 110, the electronic device 100 may display an image object 120 informing completion of the payment on a display 10. The electronic device 100 may display on the display 10 a function performing object (e.g., a split payment start 130) that may start proceeding with a split payment when the payment is completed.

The electronic device 100 may start proceeding with the split payment in response to an input of a user that selects the split payment start 130.

Referring to 1-2 of FIG. 1A, the electronic device 100 may display a split payment proceeding candidate list 140 for proceeding with the split payment on the display 10.

According to embodiments, the electronic device 100 may display a list included in an address book application as the split payment proceeding candidate list 140 for proceeding with the split payment. However, the disclosure is not limited thereto.

For example, the electronic device 100 may display a list included in a social networking service (SNS) application included in the electronic device 100 as the split payment proceeding candidate list 140. The payment application 110 may read information about the list of contacts included in the SNS application in association with the SNS application. Then, the electronic device 100 may display the list of contacts as the split payment proceeding candidate list 140.

According to another embodiment, the payment application 110 may read information about a list of members participating in one chat room included in the SNS application. Then, the electronic device 100 may display the list of members as the split payment proceeding candidate list 140. As a result, the user may easily display candidates who want to proceed with the split payment on the display 10 of the electronic device 100.

According to embodiments, the electronic device 100 may display on the display 10 a function performing object (e.g., a selection 150) that selects a person to proceed with the split payment from the split payment proceeding candidate list 140 displayed on the display 10.

In response to an input of the user that selecting the selection 150, the electronic device 100 may display a function performing object that may select a desired candidate from the candidates included in the list.

Referring to 1-3 of FIG. 1A, the electronic device 100 may display on the display 10 a function performing object 160 that may select the candidate included in the list.

According to embodiments, the electronic device 100 may distinguish and display a selected function performing object in response to a user input that selects the function performing object 160 and a non-selected function performing object. For example, the electronic device 100 may additionally display an object in a "v" shape by overlapping the object with a function performing object, such as a check box, to display the selected function performing object.

However, a method in which the electronic device 100 distinguishes and displays the candidate to proceed with the split payment from remaining candidates is not limited thereto. For example, without displaying the function performing object 160, the electronic device 100 may display a name 141 of a selected candidate in bold or may display around the name 141 of the selected candidate in a different color in response to a user input that selects the candidate included in the split payment proceeding candidate list 140. As described above, the electronic device 100 may distinguish and display the split payment proceeding candidate list 140 displayed on the display 10 and a target person selected by the user in a variety of ways.

According to embodiments, the electronic device 100 may display on the display 10 a function performing object (e.g., a confirmation 170) that may confirm a target person selected from the split payment proceeding candidate list 140 displayed on the display 10. In response to a user input that selects the confirmation 170, the electronic device 100 may confirm the selected target person.

Hereinafter, a candidate selected by the user of the electronic device 100 from the split payment proceeding candidate list 140 may be referred to as a "participant," and a person who proceeds with payment and proceeds with a split payment process may be referred to as a "representative." In other words, a split payment person may include the "representative" (e.g., the user of the electronic device 100) who proceeds with the split payment and the "participant" who uses the split payment.

Referring to 1-4 of FIG. 1B, the electronic device 100 may display a user interface that inputs a total payment amount 180 and a payment amount to be split to each target person on the display 10 when a target person who proceeds with the split payment is confirmed.

According to embodiments, the electronic device 100 may display the total payment amount 180.

For example, the electronic device 100 may display a completely paid amount in 1-1 of FIG. 1A as the total payment amount 180. According to another embodiment, the electronic device 100 may change the displayed total payment amount 180 according to a user input. For example, when the user touches a region where the entire payment amount 180 is displayed, the electronic device 100 may display a pop-up number input window for inputting numbers. When the user inputs a payment amount using the number input window, the electronic device 100 may change the displayed entire payment amount 180 to a payment amount input by the user and display the changed payment amount.

The electronic device 100 may input a payment amount of each target person according to an input of the user. For example, when the user touches a region 184 for inputting the payment amount of each target person, the electronic device 100 may display the pop-up number input window for inputting numbers. When the user inputs the payment amount of each target person using the number input window, the electronic device 100 may display an amount input by the user as the payment amount of each target person.

For example, the user may input a split payment amount of AAA as KRW 10,000 using the numeric input window, a split payment amount of BBB as KRW 15,000, and a split payment amount of CCC as KRW 5,000. In this case, AAA may be a representative and BBB and CCC may be participants.

According to embodiments, the electronic device 100 may distinguish and display a representative and participants. For example, the electronic device 100 may distinguish the representative from the participants by displaying a name of the representative in bold or in a different color. However, the method of distinguishing the representative from the participants is not limited thereto.

According to another embodiment, the electronic device 100 may automatically determine and display a payment amount of target persons of the split payment based on a total payment amount and the number of target persons of the split payment. For example, when the total payment amount is KRW 30,000 and the number of target persons of the split payment is 3, the electronic device 100 may calculate and display the payment amount of KRW 10,000 for each target person of the split payment.

According to another embodiment, the user may correct and input the payment amount of each target person of the split payment calculated automatically by the electronic device 100.

According to embodiments, the electronic device 100 may display, on the display 10, a function performing object (e.g., a determination 182) that may fix an input amount when the payment amount of each target person of the split payment is input. In response to an input of the user that selects the determination 182, the electronic device 100 may fix the input of the payment amount of each target person of the split payment.

Referring to 1-5 of FIG. 1B, the electronic device 100 may display the fixed split payment amount on the display 10.

For example, the electronic device 100 may display the split payment amount of AAA as KRW 10,000, the split payment amount of BBB as KRW 15,000, and the split payment amount of CCC as KRW 5,000.

According to embodiments, the electronic device 100 may display on the display 10 a function performing object (e.g., a confirmation 191) that may confirm the displayed split payment amount. The electronic device 100 may confirm a selected split payment amount in response to an input of the user that selects the confirmation 191.

Also, the electronic device 100 may display on the display 10 a function performing object (e.g., a correction 193) that may correct the displayed split payment amount. The electronic device 100 may display a user interface for canceling fixing of the split payment amount and inputting the split payment amount in response to an input of the user that selects the correction 193.

Referring to 1-6 of FIG. 1B, when the split payment amount corresponding to each target person of the split payment is confirmed, the electronic device 100 may transmit a notification that requests participants to deposit the split payment amount, other than a representative (e.g., the user of the electronic device 100) included in the target persons of the split payment.

For example, the electronic device 100 may display on the display 10 the participants and a confirmed request amount 195 corresponding to each participant. The electronic device 100 may also display on the display 10 a function performing object (e.g., a split payment request 197) that requests each participant for the displayed split payment amount 195.

According to embodiments, in response to an input of the user that selects the split payment request 197, the electronic device 100 may transmit a signal requesting creation of a virtual account for each participant to a first server (e.g., a server of the payment application 110) outside the electronic device 100.

The signal requesting the creation of the virtual account may include, for example, identification information of electronic devices possessed by the participants. The identification information of the electronic devices possessed by the participants may include, for example, unique numbers (e.g., serial numbers) of the electronic devices (e.g., smart phones, tablet PCs, etc.) possessed by the participants or telephone numbers matching the electronic devices possessed by the participants.

The server of the payment application 110 receiving the request of the electronic device 100 may create the virtual account for proceeding with the split payment. For example, the server of the payment application 110 may create the virtual account based on an actual account of the representative (e.g., the user of the electronic device 100), or may create the virtual account based on an actual account possessed by the payment application 110.

Also, the server of the payment application 110 may request a financial server forming a network to create the virtual account.

The virtual account may be created according to the number of participants. For example, a virtual account for BBB and a virtual account for CCC may be created. Also, the virtual account may be deposited only in an amount requested by the electronic device 100. For example, the virtual account for BBB may be deposited for KRW 15,000 and the virtual account for CCC may be deposited for KRW 5,000.

According to embodiments, the server of the payment application 110 may transmit a notification related to the split payment to electronic devices of the participants. The notification related to the split payment may include, for example, information about a target person (e.g., a representative and a participant) of the split payment, a split payment amount, and the virtual account.

The electronic device of the participant may display the information in response to a selection of the participant that selects the notification and may further guide the user to go to an application or a web site that may transfer the payment amount to the virtual account.

As such, according to embodiments of the disclosure, the electronic device 100 may provide a user interface that facilitates proceeding with the split payment. Also, the payment application 110 may guide the user to proceed with the split payment while minimizing disclosure of personal information of target persons of the split payment by using the virtual account.

Figure 2:
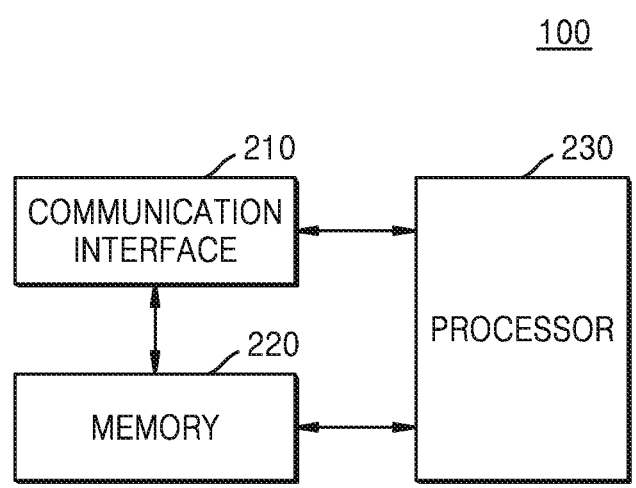
FIG. 2 is a schematic block diagram of an electronic device according to embodiments.

FIG. 2 is a schematic block diagram of the electronic device 100 according to embodiments.

Referring to FIG. 2, the electronic device 100 may include a communication interface 210, a memory 220, and a processor 230. However, the disclosure is not limited thereto.

The communication interface 210 may include, for example, a cellular interface, a wireless fidelity (WiFi) interface, a Bluetooth interface, an RF interface, and the like. The communication interface 210 may form a network with other external electronic devices such as a server based on control of the processor 230.

According to embodiments, the communication interface 210 may transmit a signal requesting to create a virtual account based on identification information of an electronic device possessed by at least one participant participating in a split payment and a split payment amount of the participant to a first server (e.g., a server of a payment application) based on control of the processor 130.

The processor 230 may drive, for example, an operating system or an application programs to control a plurality of hardware or software components connected to the processor 230 and may perform various data processing and operations.

The processor 230 according to embodiments may control the communication interface 210 to transmit the signal requesting to create the virtual account based on the identification information of the electronic device possessed by at least one participant participating in the split payment, and the split payment amount of the participant to the first server (e.g., the server of the payment application) based on control of the processor 130. Also, the processor 230 may receive a signal related to the split payment from a plurality of servers including the first server through the communication interface 210.

The memory 220 may include, for example, an internal memory or an external memory. The internal memory may include any one or any combination of, for example, a volatile memory (e.g., DRAM, SRAM, or SDRAM) and a non-volatile memory (e.g., one time programmable ROM (OTPROM), PROM, EPROM, EEPROM, mask ROM, flash ROM, flash memory, hard drive, or a solid state drive (SSD)). The external memory may include a flash drive, for example, compact flash (CF), secure digital (SD), micro-SD, mini-SD, extreme digital (xD), a multi-media card (MMC) or a memory stick, etc. The external memory may be functionally or physically connected to the electronic device 100 through various interfaces.

The memory 220 according to embodiments may store the entire amount of the split payment, a participant list participating in the split payment, the split payment amount corresponding to the participant, and identification information of the electronic device possessed by the participant.

According to embodiments, the server may also include a processor, a communication interface, and a memory. The communication interface included in the server may form a network with the electronic device 100 based on control of the processor included in the server. The communication interface included in the server may receive identification information of an external electronic device and a signal requesting to create a virtual account based on a split payment amount allocated to the external electronic device based on control of the processor included in the server from the electronic device 100.

The processor included in the server may drive, for example, an operating system or an application programs to control a plurality of hardware or software components connected to the processor included in the server and may perform various data processing and operations. The processor included in the server may create the virtual account based on the identification information of the external electronic device and the split payment amount allocated to the external electronic device.

The memory included in the server may include, for example, an internal memory or an external memory. The memory included in the server may store identification information of the electronic device 100, the identification information of the external electronic device, information related to the virtual account, and the like.

Figure 3:
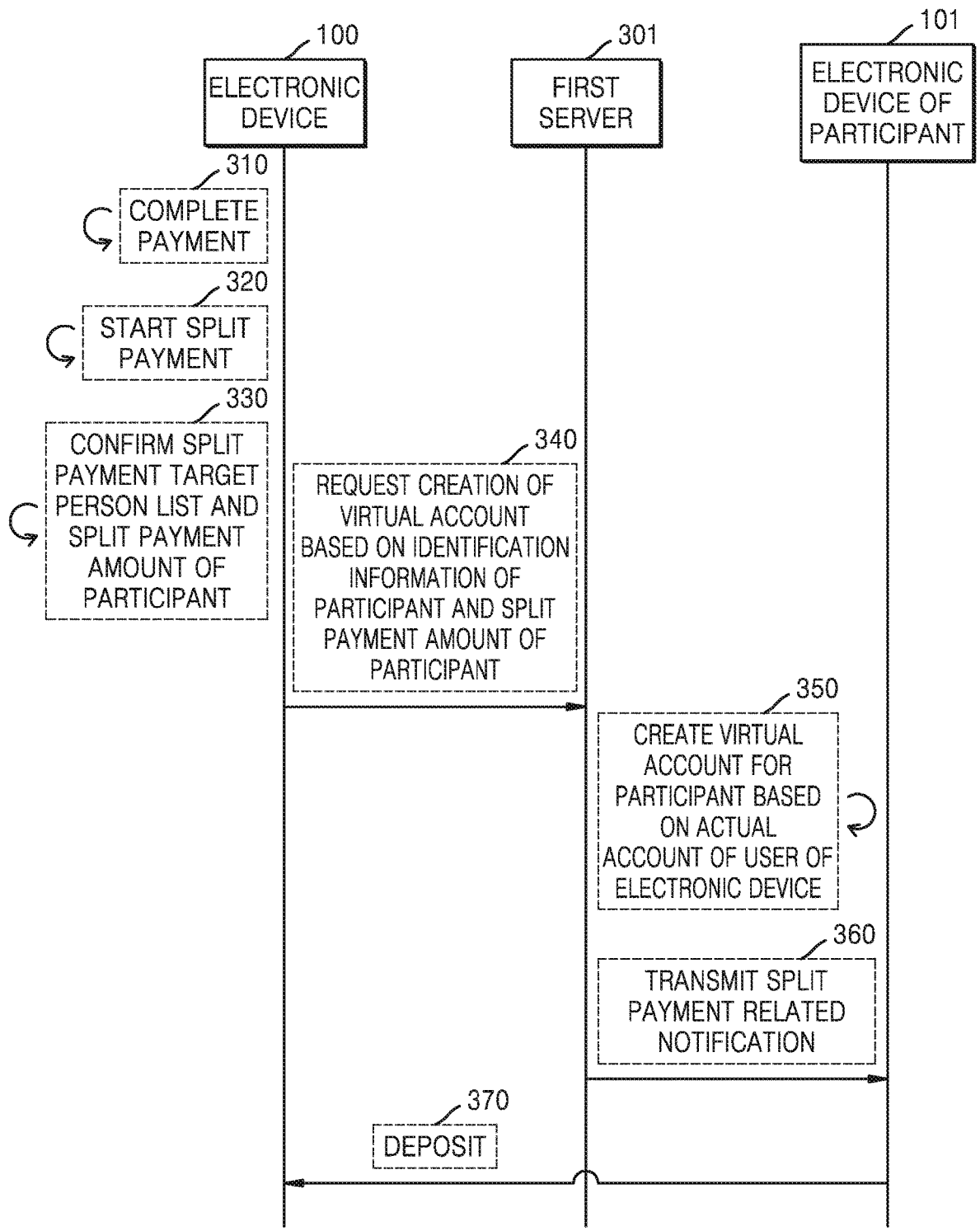
FIG. 3 is a flowchart illustrating operations performed by subjects making a split payment, according to embodiments.

FIG. 3 is a flowchart illustrating operations performed by subjects making a split payment, according to embodiments.

Referring to operation 310, the electronic device 100 may complete payment. For example, the electronic device 100 may complete payment using a payment application. The payment application may include, for example, a Samsung Pay™ Application or an Apple Pay™ Application.

Referring to operation 320, when payment is completed using the payment application, the electronic device 100 may start a split payment based on a user input.

Referring to operation 330, the electronic device 100 may confirm a split payment target person list including a representative proceeding with the split payment and a participant participating in the split payment and a split payment amount corresponding to the participant based on a user input.

Referring to operation 340, the electronic device 100 may request a first server 301 (e.g., a server of the payment application) to create a virtual account based on identification information of an electronic device possessed by the participant and the split payment amount corresponding to the participant.

Referring to operation 350, the first server 301 may create the virtual account based on an actual account of a user of the electronic device 100 created by the first server 301.

According to embodiments, the first server 301 may create the virtual account in accordance with the number of participants. For example, if there are two participants, the first server 301 may create two virtual accounts. Also, if there are five participants, the first server 301 may generate five virtual accounts.

According to embodiments, the first server 301 may create the virtual account only for the split payment amount corresponding to the participant. For example, when the split payment amount of the participant is KRW 10,000, the first server 301 may create the virtual account into which up to KRW 10,000 may be deposited. In this case, an amount exceeding the split payment amount may not be deposited into the virtual account.

Referring to operation 360, the first server 301 may transmit a notification related to the split payment to an electronic device 101 of the participant. The notification related to the split payment may include information about, for example, split payment target persons (e.g., the representative and the participant), the split payment amount, and the virtual account.

Referring to operation 370, the electronic device 101 of the participant may deposit the split payment amount corresponding to the participant into the virtual account.

Figure 4:
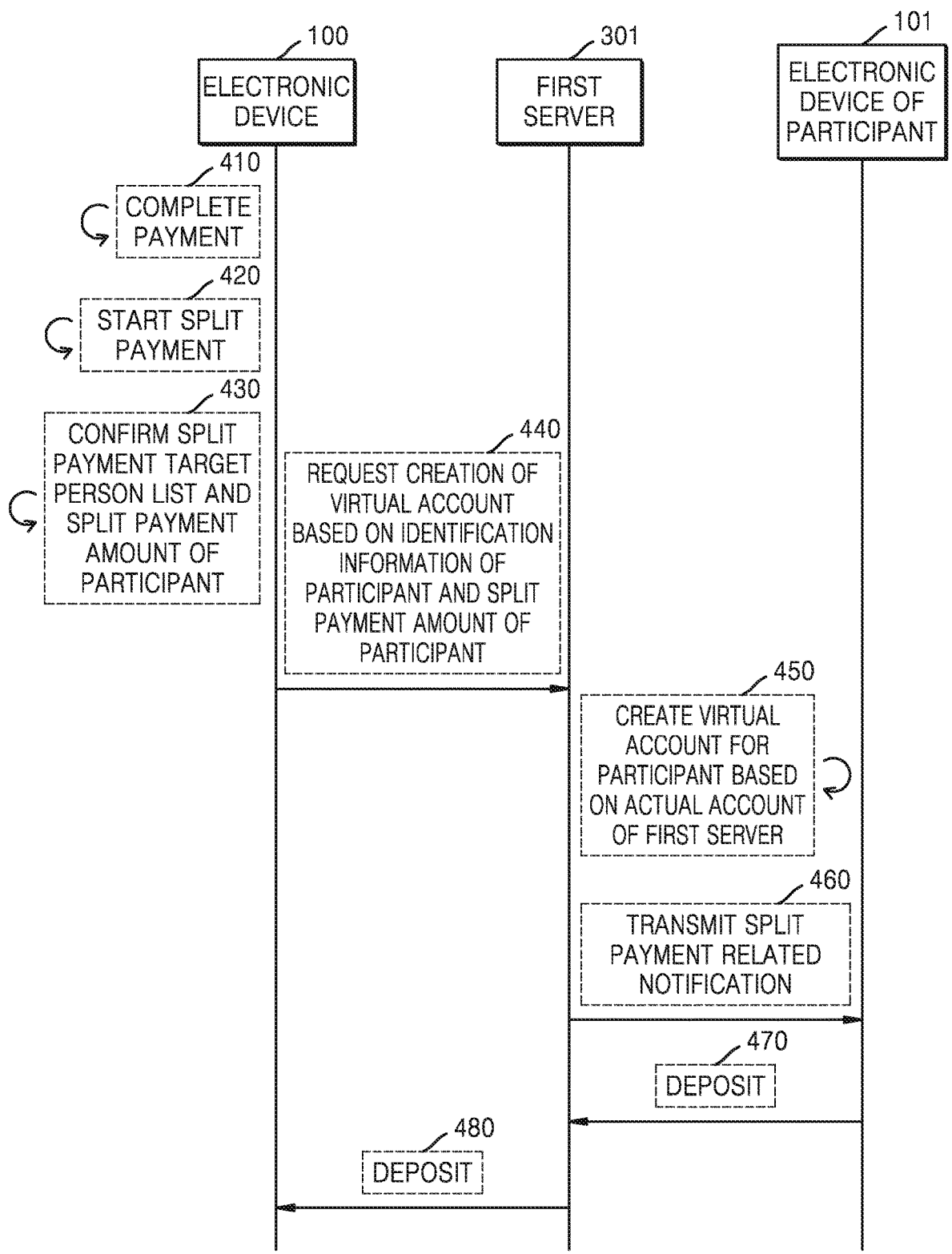
FIG. 4 is a flowchart illustrating operations performed by subjects making a split payment, according to embodiments.

FIG. 4 is a flowchart illustrating operations performed by subjects making a split payment, according to embodiments.

Referring to operation 410, the electronic device 100 may complete payment. For example, the electronic device 100 may complete payment using a payment application.

Referring to operation 420, when payment is completed using the payment application, the electronic device 100 may start a split payment based on a user input.

Referring to operation 430, the electronic device 100 may confirm a split payment target person list including a representative proceeding with the split payment and a participant participating in the split payment and a split payment amount corresponding to the participant based on a user input.

Referring to operation 440, the electronic device 100 may request the first server 301 to create a virtual account based on identification information of an electronic device possessed by the participant and the split payment amount corresponding to the participant.

Referring to operation 450, the first server 301 may create the virtual account based on an actual account of the first server 301 created by the first server 301.

According to embodiments, the first server 301 may create the virtual account in accordance with the number of participants. Also, the first server 301 may create the virtual account only for the split payment amount corresponding to the participant.

Referring to operation 460, the first server 301 may transmit a notification related to the split payment to the electronic device 101 of the participant. The notification related to the split payment may include information, for example, about split payment target persons (e.g., the representative and the participant), the split payment amount, and the virtual account.

Referring to operation 470, the electronic device 101 of the participant may deposit the split payment amount corresponding to the participant into the virtual account.

Referring to operation 480, the first server 301 may deposit the deposited split payment amount of the participant into the actual account possessed by the user of the electronic device 100.

That is, the user may proceed with the split payment using the first server 301 without the actual account of the user created by the first server 301.

Figure 5:
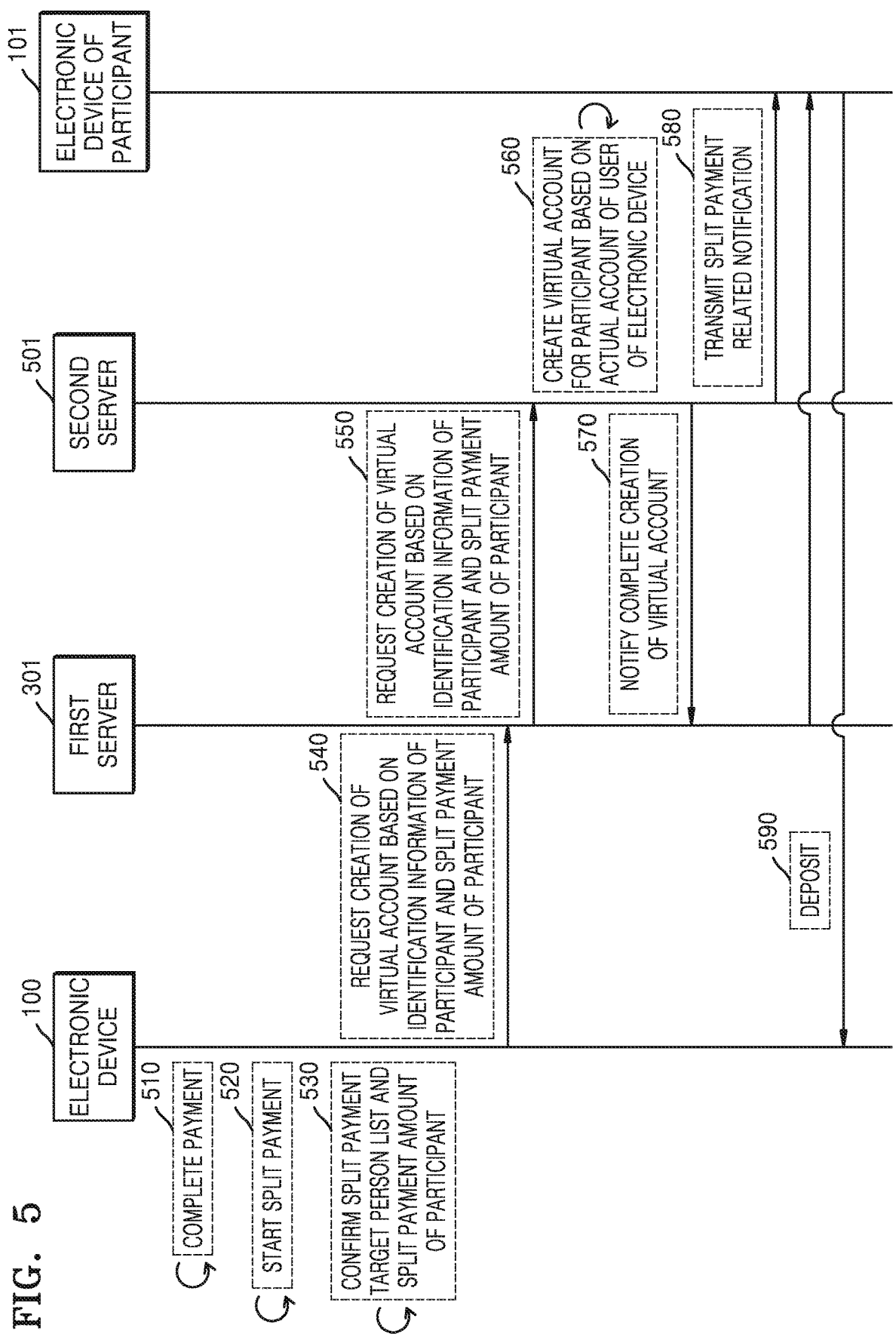
FIG. 5 is a flowchart illustrating operations performed by subjects making a split payment, according to embodiments.

FIG. 5 is a flowchart illustrating operations performed by subjects making a split payment, according to embodiments.

Referring to operation 510, the electronic device 100 may complete payment. For example, the electronic device 100 may complete payment using a payment application.

Referring to operation 520, when payment is completed using the payment application, the electronic device 100 may start a split payment based on a user input.

Referring to operation 530, the electronic device 100 may confirm a split payment target person list including a representative proceeding with the split payment and a participant participating in the split payment and a split payment amount corresponding to the participant based on a user input.

Referring to operation 540, the electronic device 100 may request the first server 301 to create a virtual account based on identification information of an electronic device possessed by the participant and the split payment amount corresponding to the participant.

Referring to operation 550, the first server 301 may transmit a request for creating a virtual account to a second server 501 (e.g., a financial server capable of creating an account) requested from the electronic device 100. For example, if an operating subject of the first server 301 may not create the account, the first server 301 may request the second server 501 that may create the virtual account to create the virtual account. According to another embodiment, when the electronic device 100 requests the first server 301 to forward the request to create the virtual account to the second server 501, the first server 301 may request the second server 501 that may create the virtual account to create the virtual account.

Referring to operation 560, the second server 501 may create the virtual account based on an actual account of a user of the electronic device 100 created by the second server 501.

According to embodiments, the second server 501 may create the virtual account according to the number of participants. Also, the second server 501 may create the virtual account only for the split payment amount corresponding to the participant.

Referring to operation 570, the second server 501 may transmit a notification that the virtual account is completely created to the first server 301.

Referring to operation 580, the first server 301 or the second server 501 may transmit a notification related to the split payment to the electronic device 101 of the participant. The notification related to the split payment may include information, for example, about split payment target persons (e.g., the representative and the participant), the split payment amount, and the virtual account.

Referring to operation 590, the electronic device 101 of the participant may deposit the split payment amount corresponding to the participant into the virtual account.

Figure 6:
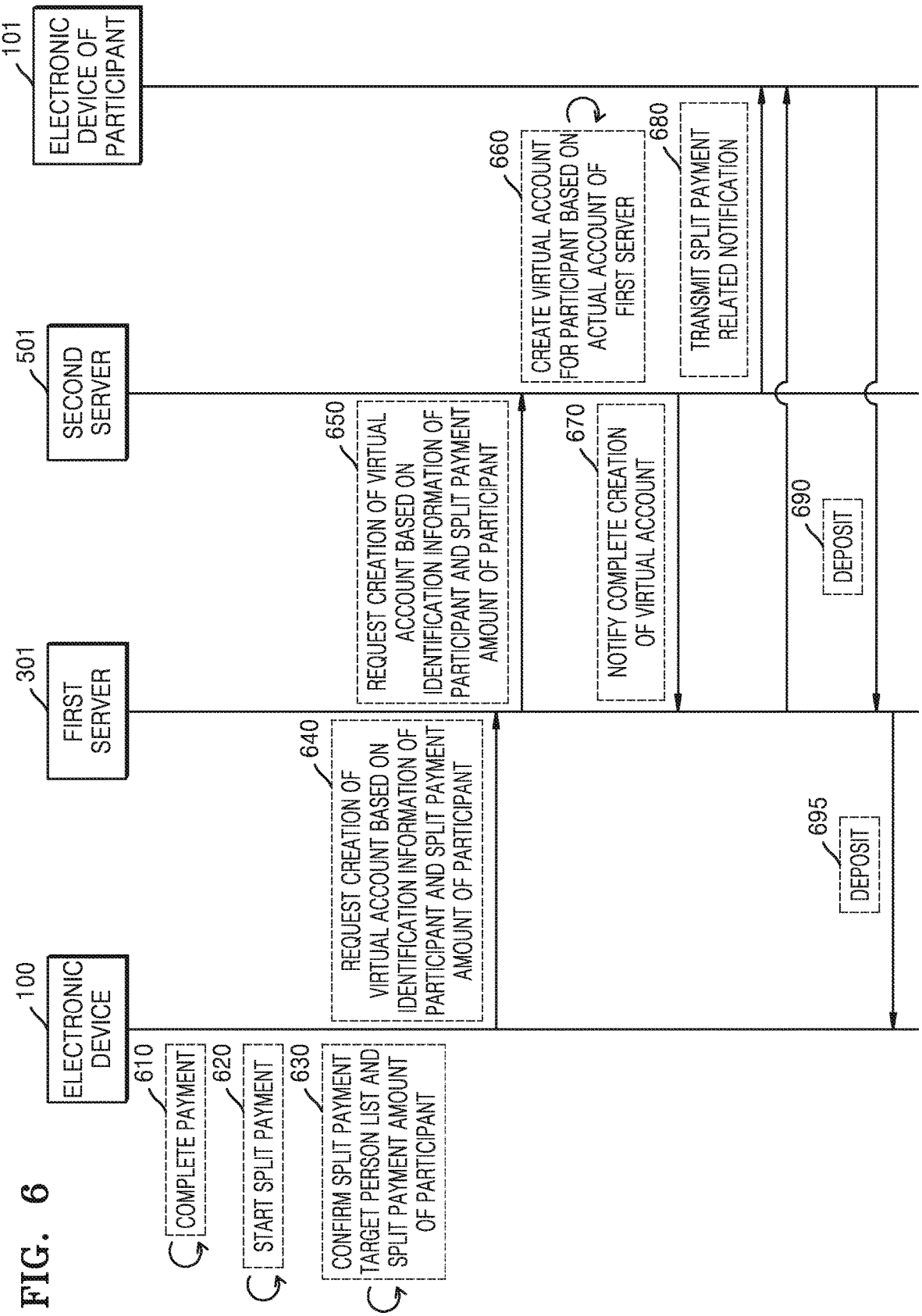
FIG. 6 is a flowchart illustrating operations performed by subjects making a split payment, according to embodiments.

FIG. 6 is a flowchart illustrating operations performed by subjects making a split payment, according to embodiments.

Referring to operation 610, the electronic device 100 may complete payment. For example, the electronic device 100 may complete payment using a payment application.

Referring to operation 620, when payment is completed using the payment application, the electronic device 100 may start a split payment based on a user input.

Referring to operation 630, the electronic device 100 may confirm a split payment target person list including a representative proceeding with the split payment and a participant participating in the split payment and a split payment amount corresponding to the participant based on a user input.

Referring to operation 640, the electronic device 100 may request the first server 301 to create a virtual account based on identification information of an electronic device possessed by the participant and the split payment amount corresponding to the participant.

Referring to operation 650, the first server 301 may transmit a request for creating a virtual account to the second server 501 requested from the electronic device 100. For example, if an operating subject of the first server 301 may not create the account, the first server 301 may request the second server 501 that may create the virtual account to create the virtual account.

Referring to operation 660, the second server 501 may create the virtual account based on an actual account of a user of the electronic device 100 created by the second server 501.

According to embodiments, the second server 501 may create the virtual account according to the number of participants. Also, the second server 501 may create the virtual account only for the split payment amount corresponding to the participant.

Referring to operation 670, the second server 501 may transmit a notification that the virtual account is completely created to the first server 301.

Referring to operation 680, the first server 301 or the second server 501 may transmit a notification related to the split payment to the electronic device 101 of the participant. The notification related to the split payment may include information, for example, about split payment target persons (e.g., the representative and the participant), the split payment amount, and the virtual account.

Referring to operation 690, the electronic device 101 of the participant may deposit the split payment amount corresponding to the participant into the virtual account.

Referring to operation 695, the first server 301 may deposit the deposited split payment amount of the participant into the actual account of the user of the electronic device 100.

That is, the user may proceed with the split payment using the first server 301 even if the second server 501 does not have the actual account of the user.

Figure 7:
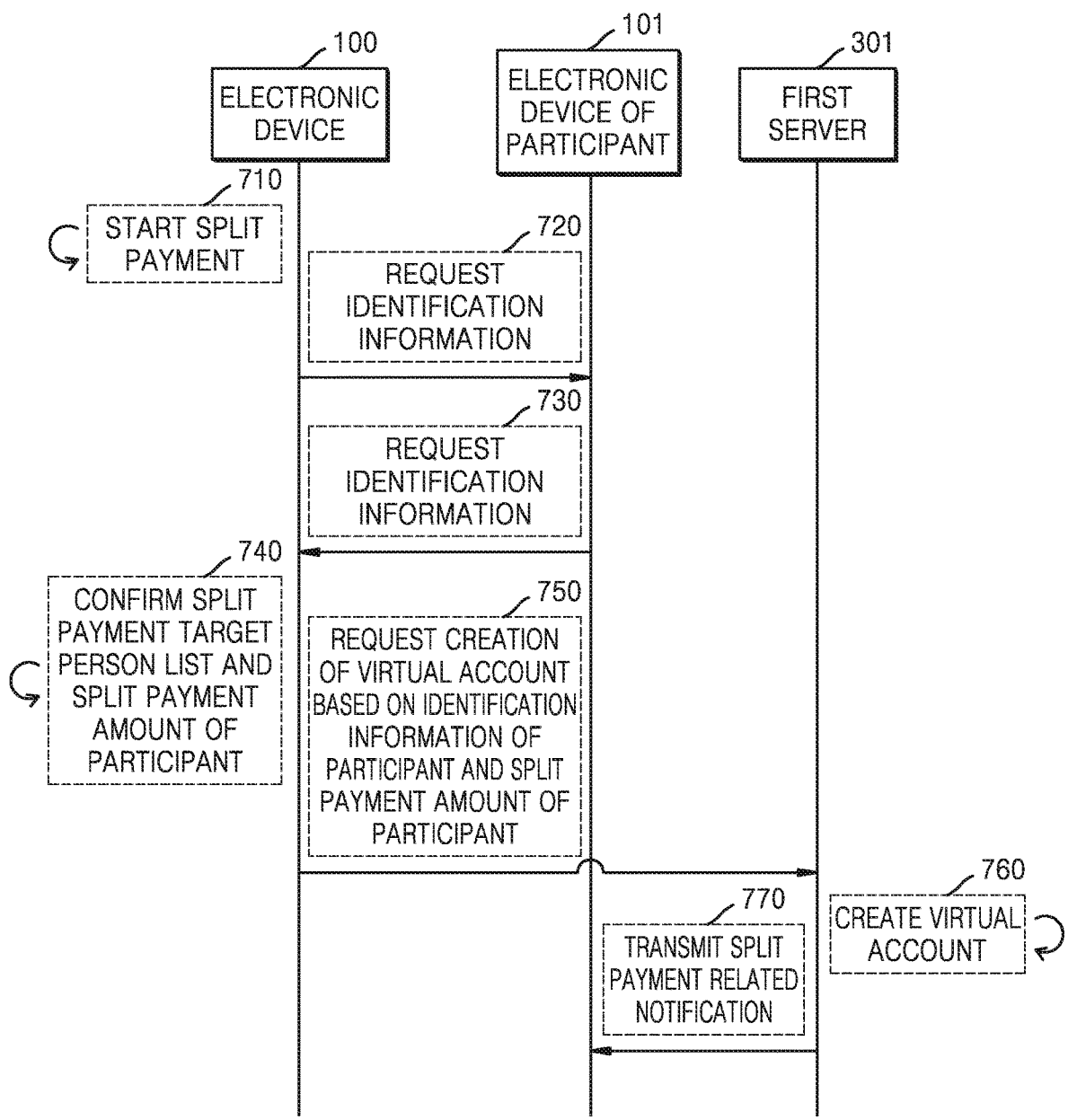
FIG. 7 is a flowchart illustrating a situation in which a participant is selected and a split payment notification including virtual account information is transmitted to the participant with respect to a split payment, according to embodiments.

FIG. 7 is a flowchart illustrating a situation in which a participant is selected and a split payment notification including virtual account information is transmitted to the participant with respect to a split payment, according to embodiments.

Referring to operation 710, the electronic device 100 may start the split payment. For example, after completing payment using a payment application, the electronic device 100 may start the split payment using the payment application.

Referring to operation 720, the electronic device 100 may request the electronic device 101 of a participant participating in the split payment for identification information of the electronic device 101 possessed by the participant. According to embodiments, the electronic device 100 and the electronic device 101 of the participant may transmit and receive data using a wireless communication method.

Wireless communication may include cellular communication using any one or any combination of, for example, LTE, LTE Advance (LTE-A), code division multiple access (CDMA), wideband CDMA (WCDMA), universal mobile telecommunications system (UMTS), Wireless Broadband (WiBro), and Global System for Mobile Communications (GSM), and the like. According to embodiments, wireless communication may include any one or any combination of, for example, wireless fidelity (WiFi), Bluetooth, Bluetooth low power (BLE), Zigbee, near field communication (NFC), Magnetic Secure Transmission, radio frequency (RF), and a body area network (BAN).

Referring to operation 730, the electronic device 101 of the participant may transmit the identification information to the electronic device 100.

Referring to operation 740, the electronic device 100 may confirm a split payment target person list including a representative proceeding with the split payment and a participant participating in the split payment by using the received identification information. Also, the electronic device 100 may confirm a split payment amount of the participant based on a user input.

Referring to operation 750, the electronic device 100 may request the first server 301 (e.g., a server of the payment application) to create a virtual account based on identification information of the participant and the split payment amount corresponding to the participant.

Referring to operation 760, the first server 301 may create the virtual account.

Referring to operation 770, the first server 301 may transmit a notification related to the split payment to the electronic device 101 of the participant. The notification related to the split payment may include information about, for example, split payment target persons (e.g., the representative and the participant), the split payment amount, and the virtual account.

Figure 8:
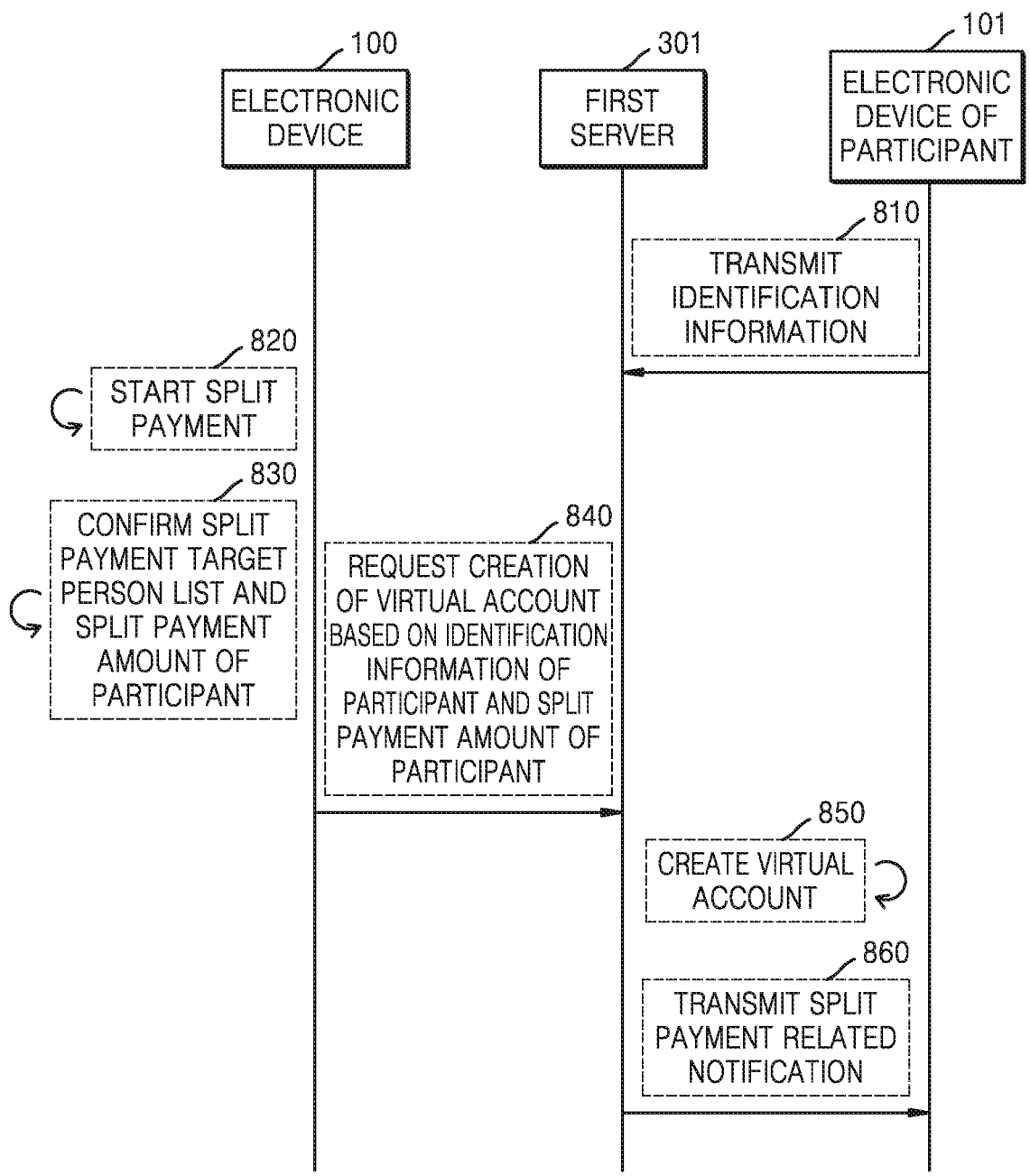
FIG. 8 is a flowchart illustrating a situation in which a participant is selected and a split payment notification including virtual account information is transmitted to the participant with respect to a split payment, according to embodiments.

FIG. 8 is a flowchart illustrating a situation in which a participant is selected and a split payment notification including virtual account information is transmitted to the participant with respect to a split payment, according to embodiments.

FIG. 8 may be the case in which both the electronic device 100 and the electronic device 101 of the participant have installed a payment application provided by the first server 301 (e.g., a server of the payment application).

Referring to operation 810, the electronic device 101 of the participant may transmit identification information to the first server 301 (e.g., the server of the payment application). For example, when the electronic device 101 of the participant has installed the payment application, the payment application may receive the identification information from the electronic device 101 of the participant.

Referring to operation 820, the electronic device 100 may start the split payment. For example, after completing payment using the payment application, the electronic device 100 may start the split payment using the payment application.

Referring to operation 830, the electronic device 100 may confirm a split payment target person list including a representative proceeding with the split payment and a participant participating in the split payment by using the received identification information. Also, the electronic device 100 may confirm a split payment amount of the participant based on a user input.

Referring to operation 840, the electronic device 100 may request the first server 301 to create a virtual account based on identification information of the participant and the split payment amount corresponding to the participant.

Referring to operation 850, the first server 301 may create the virtual account.

Referring to operation 860, the first server 301 may transmit a notification related to the split payment to the electronic device 101 of the participant. The notification related to the split payment may include information about, for example, split payment target persons (e.g., the representative and the participant), the split payment amount, and the virtual account.

Figure 9:
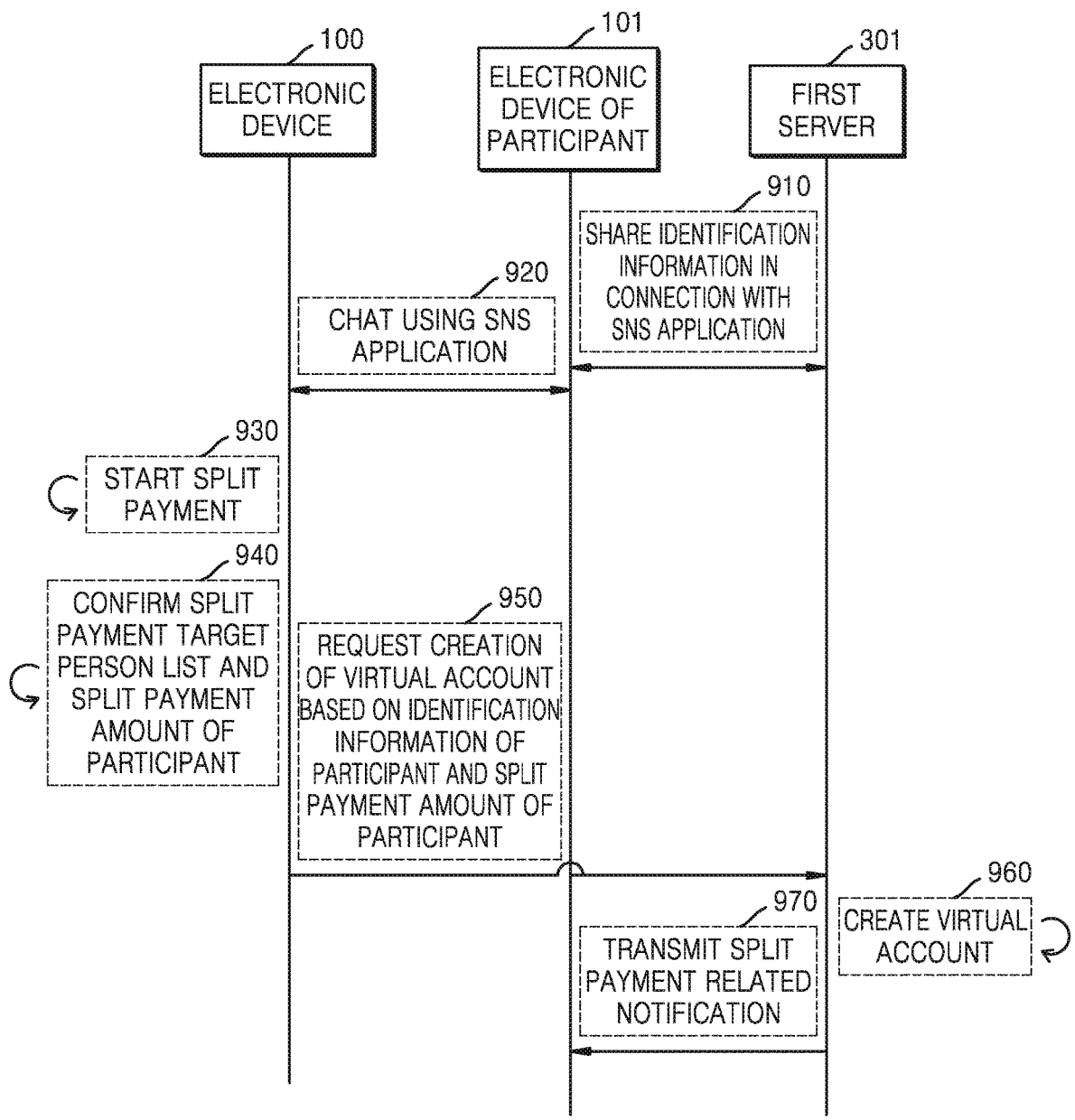
FIG. 9 is a flowchart illustrating a situation in which a participant is selected and a split payment notification including virtual account information is transmitted to the participant with respect to a split payment, according to embodiments.

FIG. 9 is a flowchart illustrating a situation in which a participant is selected and a split payment notification including virtual account information is transmitted to the participant with respect to a split payment, according to embodiments.

According to embodiments, FIG. 9 may be the case both the electronic device 100 and the electronic device 101 of the participant have installed a payment application provided by the first server 301 (e.g., a server of the payment application). Also, FIG. 9 may be the case in which the electronic device 100 and the electronic device 101 of the participant install and use the same SNS application and the SNS application share the payment application installed in the electronic device 100 and the electronic device 101 of the participant and information about contacts included in the SNS application.

Referring to operation 910, the first server 301 (e.g., the server of the payment application) may use the payment application to share the information about the contacts included in the SNS application installed in the electronic device 101 of the participant.

Referring to operation 920, the electronic device 100 and the electronic device 101 of the participant may send and receive text messages, still images, moving images, etc. using data communication, such as the SNS application or a messenger application.

Referring to operation 930, the electronic device 100 may start the split payment. For example, the user may perform a split payment function that is a selectable option in a chat window of the SNS application. In this case, the electronic device 100 may perform the payment application to proceed with the split payment and select a party to which a message is exchanged in the SNS application as a split payment participant.

Referring to operation 940, the electronic device 100 may confirm a split payment target person list including a representative proceeding with the split payment and the participant participating in the split payment based on a user input. Also, the electronic device 100 may confirm a split payment amount of the participant based on a user input.

Referring to operation 950, the electronic device 100 may request the first server 301 to create a virtual account based on identification information of the participant and the split payment amount corresponding to the participant.

Referring to operation 960, the first server 301 may create the virtual account.

Referring to operation 970, the first server 301 may transmit a notification related to the split payment to the electronic device 101 of the participant. The notification related to the split payment may include information about, for example, split payment target persons (e.g., the representative and the participant), the split payment amount, and the virtual account.

Figure 10:
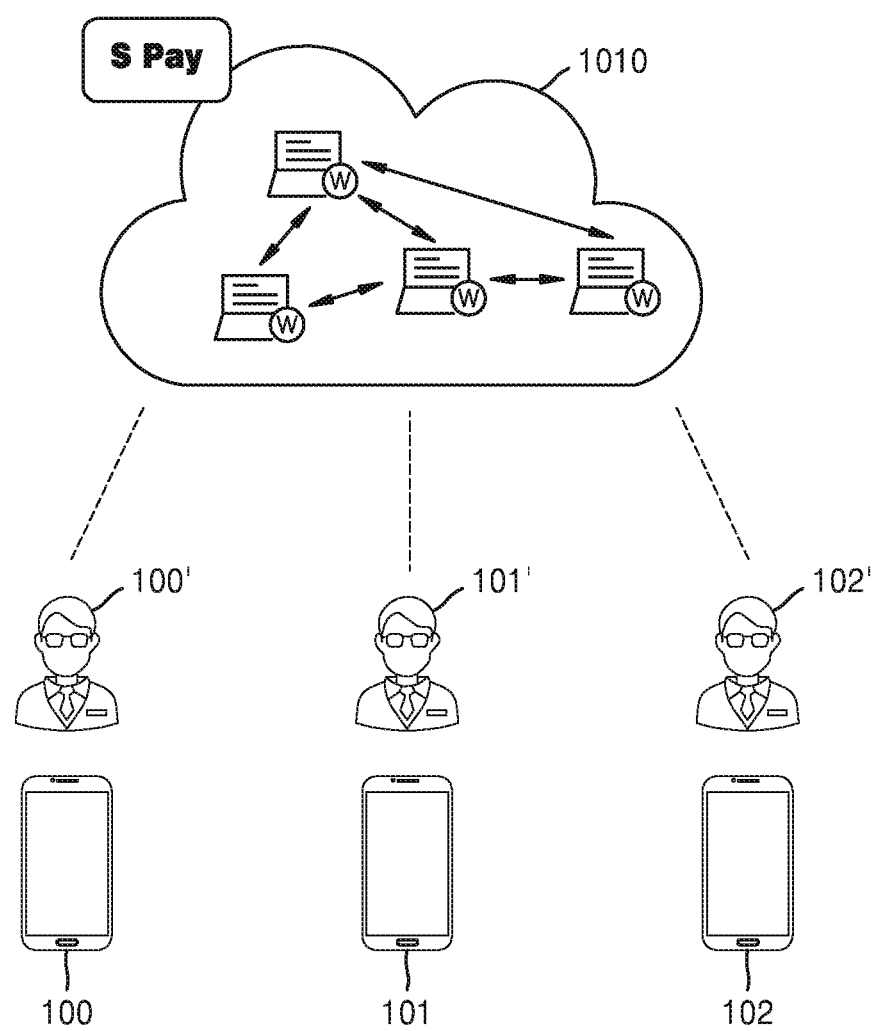
FIG. 10 is a diagram for explaining a method of remitting a split payment amount, using a payment application with respect to a split payment method, according to embodiments.

FIG. 10 is a diagram for explaining a method of remitting a split payment amount, using a payment application with respect to a split payment method, according to embodiments.

Referring to FIG. 10, the electronic device 100 of a representative 100' proceeding with a split payment and the electronic device 101 of a first participant 101" and an electronic device 102 of a second participant 102" participating in the split payment may all form a network with a first server 1010 (e.g., a server of the payment application). For example, the electronic devices 100, 101, and 102 may transmit and receive data to and from a server 1010 of the payment application using the payment application. According to embodiments, the server 1010 of the payment application may include a cloud server.

According to embodiments, when all of target persons of the split payment use the same payment application and own accounts created in the server 1010 of the payment application, the first participant 101" and the second participant 102" may remit the split payment amount using the payment application.

For example, the server 1010 of the payment application may transmit a notification related to the split payment to the electronic device 101 of the first participant 101" and the electronic device 102 of the second participant 102". When the first participant 101" and the second participant 102" select the received notification, the electronic device 101 of the first participant 101" and the electronic device 102 of the second participant 102" execute the payment application and display a payment amount of the representative 100" proceeding with the split payment, the first participant 101" and the second participant 102", and a virtual account.

In this case, the electronic device 101 of the first participant 101" and the electronic device 102 of the second participant 102" may remit the payment amount from accounts of the first participant 101" and the second participant 102" in the server 1010 of the payment application to the virtual account based on the payment amount and selections of the first participant 101" and the second participant 102" confirming transmission to the virtual account.

That is, when the first participant 101" and the second participant 102" own the accounts created in the server 1010 of the payment application, the first participant 101" and the second participant 102" may remit the payment amount to the virtual account without a procedure such as inputting a separate account number.

According to another embodiment, when all of the target persons of the split payment use the same payment application, the first participant 101" and the second participant 102" may remit the split payment amount using the payment application.

For example, the server 1010 of the payment application may transmit a notification related to the split payment to the electronic device 101 of the first participant 101" and the electronic device 102 of the second participant 102". When the first participant 101" and the second participant 102" select the received notification, the electronic device 101 of the first participant 101" and the electronic device 102 of the second participant 102" execute the payment application and display the payment amount of the representative 100" proceeding with the split payment, the first participant 101" and the second participant 102", and the virtual account.

In this case, the first participant 101" and the second participant 102" may use a remittance function included in the payment application. For example, when the first participant 101" and the second participant 102" enter an account number created by another financial institution and a payment amount in the payment application, the server 1010 of the payment application may receive and remit the payment amount to a previously created virtual account in association with the financial institution that owns accounts of the first participant 101' and the second participant 102'.

That is, even if a participant does not have the account created in the server 1010 of the payment application, the participant may remit the payment amount to the virtual account using the payment application.

Figure 11:
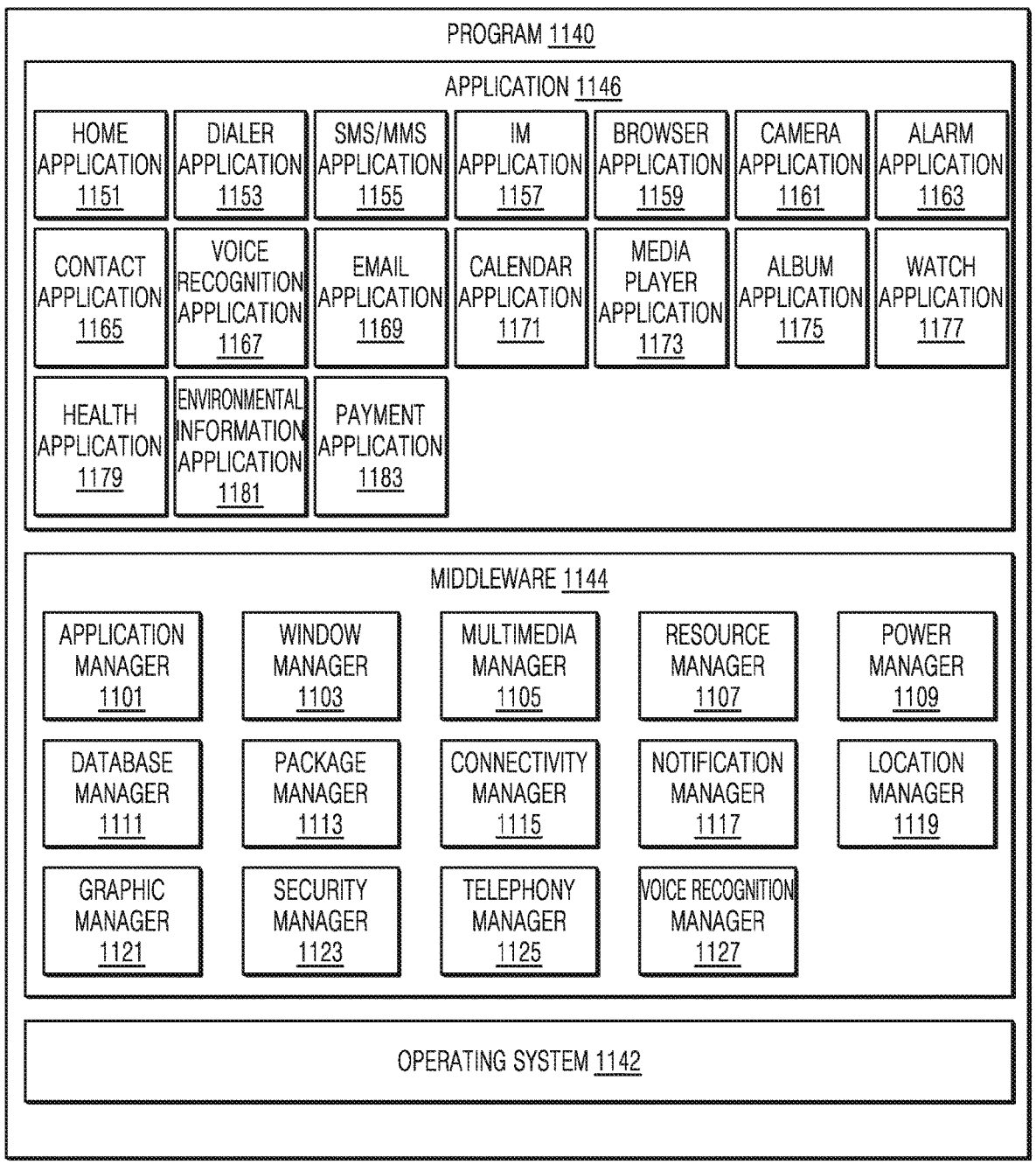
FIG. 11 is a block diagram of a program according to embodiments.

FIG. 11 is a block diagram of a program 1140 according to embodiments.

According to embodiments, the program 1140 may include an operating system 1142 for controlling one or more resources of the electronic device 100, middleware 1144, or an application 1146 executable on the operating system 1142. The operating system 1142 may include, for example, Android™, iOS™ Windows™, Symbian™, Tizen™, or Bada™. At least some of the programs 1140 may be, for example, preloaded in the electronic device 100 at the time of manufacture, or downloaded or updated from an external electronic device (e.g., an electronic device or a server) in a use environment of a user.

The operating system 1142 may control (e.g., allocate or recover) system resources (e.g., processes, memory, or power) of the electronic device 100. The operating system 1142 may additionally or alternatively include one or more driver programs for driving other hardware devices of the electronic device 100, for example, an input device, an audio output device, a display device, an audio module, a sensor module, an interface, a haptic module, a camera module, a power management module, a battery, a communication module, a subscriber identity module, and an antenna module.

The middleware 1144 may provide various functions to the application 1146 such that the application 1146 may use functions or information provided by one or more resources of the electronic device 100. The middleware 1144 may include, for example, an application manager 1101, a window manager 1103, a multimedia manager 1105, a resource manager 107, a power manager 1109, a database manager 1111, a package manager 1113, a connectivity manager 1115, a notification manager 1117, a location manager 1119, a graphic manager 1121, a security manager 1123, a telephony manager 1125, and/or a voice recognition manager 1127.

The application manager 1101 may manage, for example, a life cycle of the application 1146. The window manager 1103 may manage, for example, GUI resources used on a screen. The multimedia manager 1105 may recognize, for example, a format for reproducing media files and perform encoding or decoding of the media files using a codec according to the format. The resource manager 1107 may manage, for example, a source code of the application 1146 or a space of memory. The power manager 1109 may manage, for example, capacity, temperature, or power supply of the battery and determine or provide power information for an operation of the electronic device 100 by using relevant information. According to embodiments, the power manager 1109 may interact with a basic input/output system (BIOS).

The database manager 1111 may, for example, create, retrieve, or modify a database to be used in the application 1146. The package manager 1113 may manage installation or update of an application distributed, for example, in the form of a package file. The connectivity manager 1115 may, for example, manage a wireless or wired connection between the electronic device 100 and an external electronic device. The notification manager 1117 may provide a function for notifying a user of an event (e.g., a call, a message, or an alarm) that has occurred. The location manager 1119 may manage, for example, location information of the electronic device 100. The graphic manager 1121 may manage, for example, a graphical effect to be presented to the user or a user interface associated therewith. The security manager 1123 may provide, for example, system security or user authentication. The telephony manager 1125 may, for example, manage a voice call function or a video call function of the electronic device 100. The voice recognition manager 1127 may, for example, transmit voice data of the user to an external server and receive an instruction corresponding to a function to be performed in the electronic device 100 based on the voice data or text data converted based on the voice data.

According to embodiments, the middleware 1144 may dynamically delete some existing components or add new components. According to embodiments, at least a part of the middleware 1144 may be included as part of the operating system 1142 or may be implemented in software separate from the operating system 1142.

The application 1146 may include, for example, a home application 1151, a dialer application 1153, an SMS/MMS application 1155, an instant message (IM) application 1157, a browser application 1159, a camera application 1161, an alarm application 1163, a contact application 1165, a voice recognition application 1167, an email application 1169, a calendar application 1171, a media player application 1173, an album application 1175, a watch application 1177, a health application 1179 (e.g., measurement of an exercise amount or blood sugar), an environmental information application 1181 (e.g., air pressure, humidity, or temperature information), and/or a payment application 1183. According to embodiments, the application 1146 may further include an information exchange application that may support an exchange of information between the electronic device 100 and an external electronic device. The information exchange application may include, for example, a notification relay application for transmitting information (e.g., calls, messages, or alarms) designated to the external electronic device, or a device management application for managing the external electronic device. The notification relay application may, for example, transmit notification information corresponding to an event (e.g., a mail reception) occurred in another application (e.g., the email application 1169) of the electronic device 100 to the external electronic device or receive notification information from the external electronic device and provide it to a user of the electronic device 100. The device management application may, for example, control power (e.g., turn on or turn off) or function (e.g., brightness, resolution, or focus of a display device or a camera module) of an external electronic device that communicates with the electronic device 100 or some components thereof (e.g., the display device or the camera module). The device management application may additionally or alternatively support installation, deletion, or update of an application running on the external electronic device.

Figure 12A:
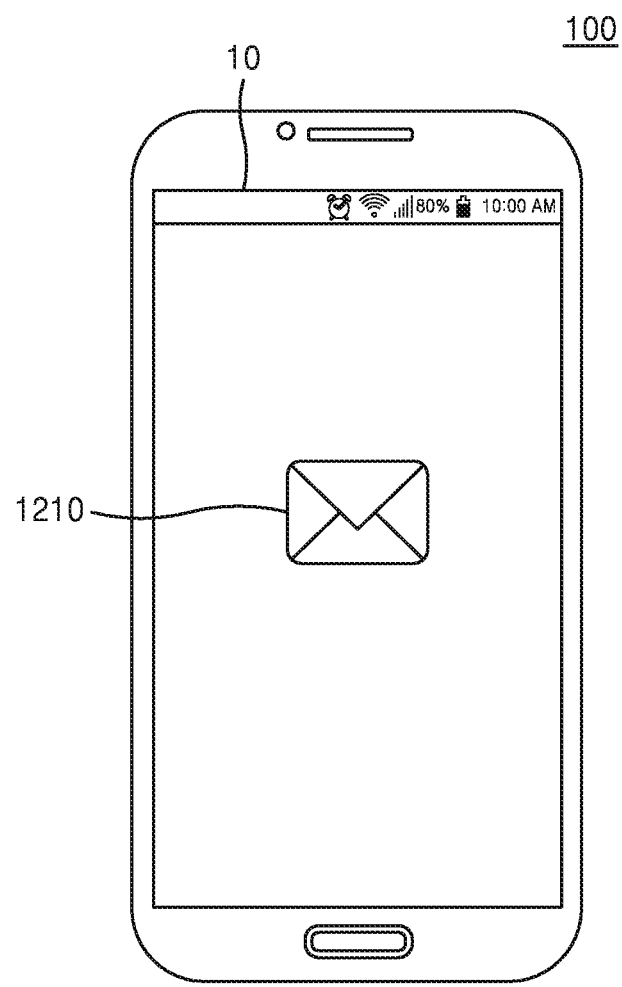
FIGS. 12A, 12B and 12C are diagrams for explaining a situation in which an electronic device executes an application related to remittance of a payment amount, based on a received split payment notification, according to embodiments.
Figure 12B:
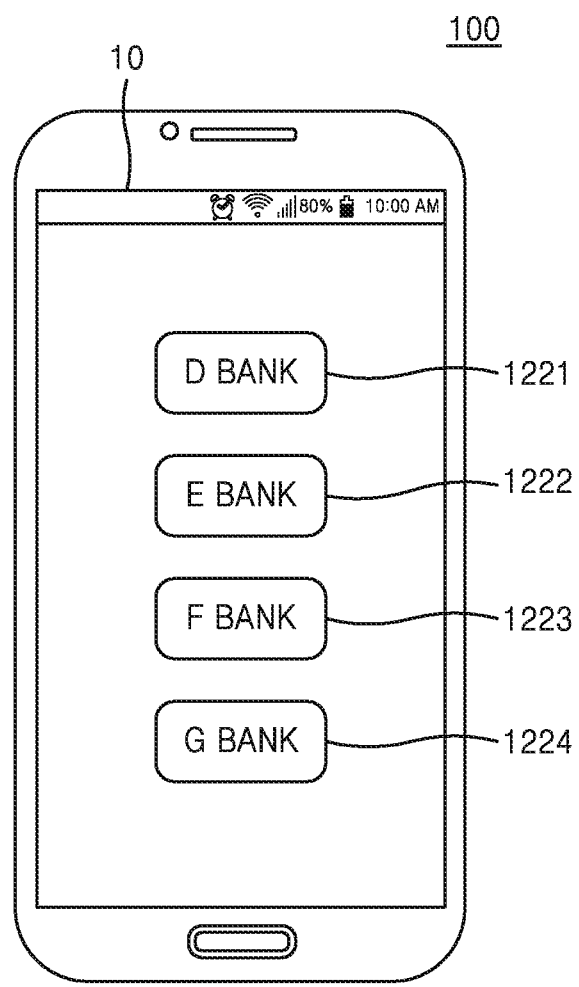
Figure 12C:
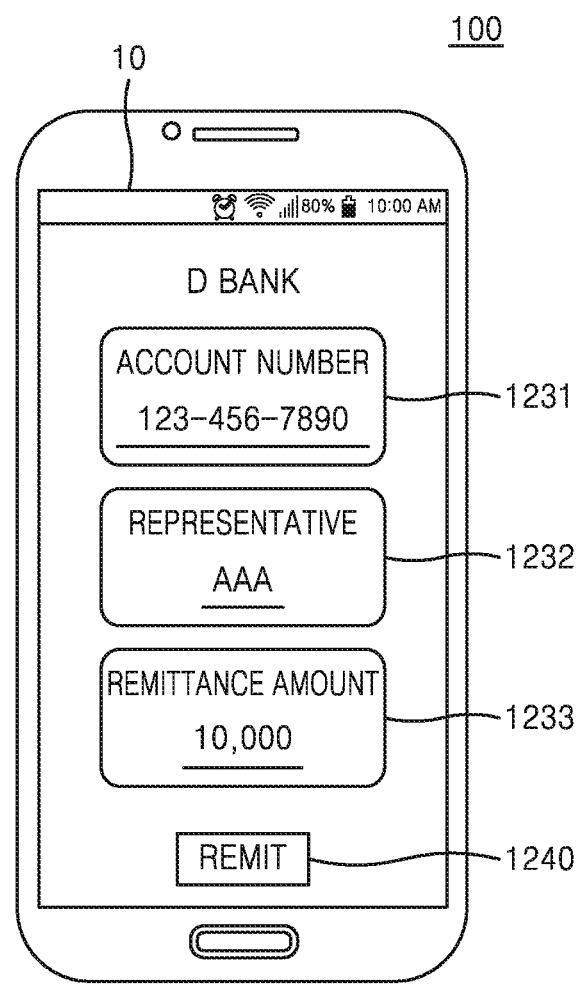

FIGS. 12A, 12B and 12C are diagrams for explaining a situation in which the electronic device 100 executes an application related to remittance of a payment amount, based on a received split payment notification, according to embodiments.

Referring to FIG. 12A, the electronic device 100 may receive a split payment related message 1210 and display the split payment related message 1210 on the display 10. For example, when the split payment related message 1210 is received, a notification manager (e.g., the notification manager 1117 of FIG. 11) may execute an SMS/MMS application (e.g., the SMS/MMS application 1155 of FIG. 11) corresponding to the received message, or an IM application (e.g., the IM application 1157 of FIG. 11) to inform a user of the received message. According to embodiments, the split payment related message 1210 may include split payment target persons (e.g., a representative and a participant), a split payment amount, information about a virtual account, and an instruction to search for a payment application with a remittance function (e.g., the payment application 1183 of FIG. 11, a mobile banking application, or a transfer application).

Referring to FIG. 12B, the electronic device 100 may search for and display the mobile banking application or the remittance application corresponding to a user input that selects the split payment related message 1210 displayed on the display 10.

For example, a resource manager (e.g., the resource manager 1107 of FIG. 11) of the electronic device 100 may transmit an instruction to search for a payment application (or the mobile banking application or the remittance application) included in a source code of the split payment message 1210 to a processor (e.g., the processor 230 of FIG. 2). The processor (e.g., the processor 230 of FIG. 2) controls payment applications such as a "D Bank" application 1221, an "E Bank" application 1222, an "F Remittance" application 1223, and "G Remittance" application 1224 to be searched for and displayed on the display 10.

Referring to FIG. 12C, the electronic device 100 may execute a selected application corresponding to a user input that selects one of the mobile banking application and the remittance application displayed on the display 10.

For example, the electronic device 100 may display a user interface that executes the "D Bank" application 1221 in response to a user input that selects the "D Bank" application 1221.

The user interface of the "D Bank" application 1221 may include, for example, any one or any combination of a virtual account number 1231, a representative name 1232, and a remittance amount 1233. However, the disclosure is not limited thereto. The user interface may further include contents for proceeding with the split payment.

According to embodiments, the user interface of the "D Bank" application 1221 may input and display the virtual account number 1231, the representative name 1232, and the remittance amount 1233 based on information included in the split payment related message 1210. In this case, when the user selects a region on which the remittance amount 1233 is displayed, the electronic device 100 may display a number input window. The user may change the payment amount by using the number input window.

According to embodiments, the electronic device 100 may display a functional object (e.g., a remittance 1240) for performing remittance on the display 10. The electronic device 100 may perform the remittance in response to an input of the user that selects the "remittance 1240."

Figure 13A:
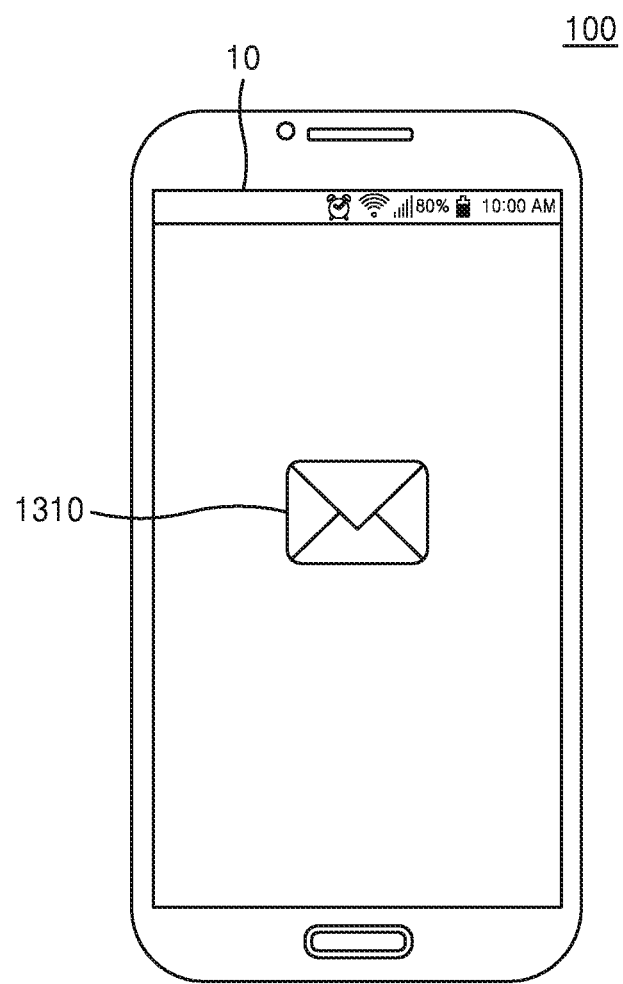
FIGS. 13A and 13B are diagrams for explaining a situation in which an electronic device executes a website related to remittance of a payment amount, based on a received split payment notification, according to embodiments.
Figure 13B:
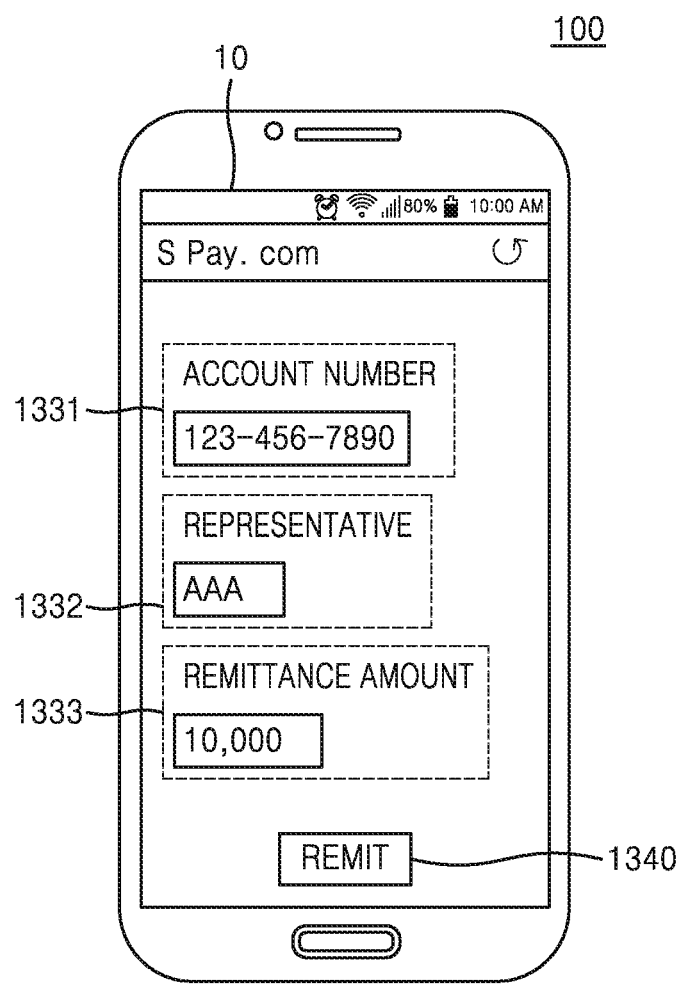

FIGS. 13A and 13B are diagrams for explaining a situation in which an electronic device executes a website related to remittance of a payment amount, based on a received split payment notification, according to embodiments.

Referring to FIG. 13A, the electronic device 100 may receive a split payment related message 1310 and display the split payment related message 1310 on the display 10. For example, when the split payment related message 1310 is received, a notification manager (e.g., the notification manager 1117 of FIG. 11) may execute an SMS/MMS application (e.g., the SMS/MMS application 1155 of FIG. 11)

corresponding to the received message, or an IM application (e.g., the IM application 1157 of FIG. 11) to inform a user of the received message. According to embodiments, the split payment related message 1310 may include split payment target persons (e.g., a representative and a participant), a split payment amount, information about a virtual account, and an instruction to search for the website with a remittance function.

Referring to FIG. 13B, in response to a user input that selects the split payment related message 1310 displayed on the display 10, the electronic device 100 may display the website related to a predetermined remittance on the display 10.

For example, a resource manager (e.g., the resource manager 1107 of FIG. 11) of the electronic device 100 may send an instruction to search for and display a website associated with a payment progress included in a source code of the split payment message 1310 to a processor (e.g., the processor 230 of FIG. 2). The processor (e.g., the processor 230 of FIG. 2) may search for and display, for example, an "S pay" website.

The "S pay" website may display, for example, any one or any combination of a virtual account number 1331, a representative name 1332, and a remittance amount 1333. However, the disclosure is not limited thereto. The "S pay" website may further display contents for proceeding with the split payment.

According to embodiments, the "S pay" website may input and display the virtual account number 1331, the representative name 1332, and the remittance amount 1333 based on information included in the split payment related message 1310. In this case, when the user selects a region on which the remittance amount 1333 is displayed, the electronic device 100 may display a number input window. The user may change a payment amount by using the number input window.

According to embodiments, the electronic device 100 may display a functional object (e.g., a remittance 1340) for performing remittance on the display 10. The electronic device 100 may perform the remittance in response to a user input that selects the "remittance 1340."

The embodiments may be implemented in a software program that includes instructions stored on a computer-readable storage medium.

A computer may be a device capable of calling stored instructions from a storage medium and operating according to the embodiments according to the called instructions, and the computer may include an electronic device according to the embodiments.

The computer-readable storage medium may be provided in the form of a non-transitory storage medium. Here, 'non-transitory' means that the storage medium does not include a signal and is tangible, but does not distinguish whether data is stored semi-permanently or temporarily on a storage medium.

Also, the control method according to the embodiments may be provided in a computer program product. A computer program product may be traded between a seller and a purchaser as a commodity.

The computer program product may include a software program and a computer-readable storage medium having the software program stored therein. For example, the computer program product may include a product in the form of a software program (e.g., a downloadable app) that is electronically distributed through a manufacturer of an electronic device or an electronic marketplace (e.g., Google Play Store or AppStore). For electronic distribution, at least a part of the software program may be stored on a storage medium or may be created temporarily. In this case, the storage medium may be a storage medium of a server of a manufacturer, a server of an electronic market, or a relay server for temporarily storing the SW program.

The computer program product may include, in a system including a server and an electronic device, a storage medium of a server or a storage medium of an electronic device. Alternatively, when there is a third device (e.g., a smart phone) in communication with the server or the electronic device, the computer program product may include a storage medium of the third device. Alternatively, the computer program product may include a S/W program itself transmitted from the server to the electronic device or to the third device, or from the third device to the electronic device.

In this case, one of the server, the electronic device, and the third device may execute the computer program product to perform the method according to the embodiments. Alternatively, two or more of the server, the electronic device, and the third device may execute the computer program product to distribute and perform the method according to the embodiments.

For example, a server (e.g., a cloud server or an artificial intelligence server, etc.) may execute a computer program product stored on a server to control an electronic device communicatively connected to the server to perform the method according to the embodiments.

As another example, the third device may execute the computer program product to control an electronic device communicatively connected to the third device to perform the method according to the embodiment. As an example, the third device may remotely control the electronic device to transmit electronic device identification information to a server device, store user identification information received from the server device, and display a purchase history received from the server device on a display.

When the third device executes the computer program product, the third device may download the computer program product from the server and execute the downloaded computer program product. Alternatively, the third device may execute a computer program product provided in a preloaded manner to perform the method according to the embodiments.

According to embodiments of the disclosure, one of persons who wish to perform a split payment may perform payment as a representative and remit a payment amount, using a virtual account created for participants other than the representative, thereby improving supplementation.

According to embodiments of the disclosure, an electronic device may proceed with a split payment in conjunction with a messenger application used by persons who want to perform the split payment.

According to embodiments of the disclosure, when an electronic device receives a notification related to a split payment, an application related to money transfer may be easily provided to a user.

It may be understood that the embodiments described herein may be considered in a descriptive sense only and not for purposes of limitation. Descriptions of features or aspects within each of the embodiments may be considered as available for other similar features or aspects in others of the embodiments.

While the disclosure has been shown and described with reference to the embodiments thereof, it will be understood by those of ordinary skill in the art that various changes in form and details may be made therein without departing from the spirit and scope of the disclosure as defined by the appended claims and their equivalents.

What is claimed is:

1. An electronic device comprising:
a communication interface;
a non-transitory memory storing instructions; and
a processor,
wherein the memory stores instructions that cause the processor to:
complete a payment by a user of the electronic device using a payment application;
start a split payment by the user using the payment application;
based on the split payment being started, control the communication interface to transmit, directly to each of one or more external electronic devices, a signal requesting electronic serial number identification information of the each of the one or more external electronic devices, each of users of the one or more external electronic devices participating in the split payment;
receive the electronic serial number identification information directly from the each of the one or more external electronic devices via the communication interface;
based on the electronic serial number identification information being received directly from the each of the one or more external electronic devices, control the communication interface to transmit, to a first server located outside the electronic device, a signal requesting the first server to create one or more separate virtual accounts associated with the electronic serial number identification information of the each of one or more external electronic devices based on a separate split payment amount allocated to the each of the one or more external electronic devices,
wherein the first server transmits a notification regarding the split payment amount allocated to the each of the one or more external electronic devices and respective virtual account information of the one or more separate virtual accounts, to the each of the one or more external electronic devices; and
receive a deposit from the each of the users of the one or more external electronic devices into a respective one of the one or more separate virtual accounts, up to the split payment amount allocated to the each of the one or more external electronic devices.

2. The electronic device of claim 1, wherein the memory stores the instructions that further cause the processor to control the communication interface to transmit, to the first server, the signal requesting the first server to create the one or more separate virtual accounts, using a payment application that is provided by the first server.

3. The electronic device of claim 1, wherein the one or more separate virtual accounts are created by the first server and are associated with an actual account that is owned by a user of the electronic device.

4. The electronic device of claim 1, wherein the one or more separate virtual accounts are created by the first server and are associated with an actual account that is owned by an owner of the first server.

5. The electronic device of claim 1, wherein the memory stores the instructions that further cause the processor to control the communication interface to transmit, to the first server, another signal requesting a second server located outside the electronic device to create the one or more separate virtual accounts, based on the electronic serial number identification information of the each of the one or more external electronic devices participating in the split payment and the split payment amount allocated to the each of the one or more external electronic devices.

6. The electronic device of claim 1, further comprising a display,
wherein the memory stores the instructions that further cause the processor to, based on receiving, from the first server, a notification including an instruction configured to search for an application providing a remittance function or a payment function, control the display to display an execution screen of the application that is previously installed in the electronic device.

7. The electronic device of claim 1, further comprising a display,
wherein the memory stores the instructions that further cause the processor to, based on receiving, from the first server, a notification including an instruction configured to execute a website providing a remittance function or a payment function, control the display to display the website that is found by the electronic device.

8. A control method using an electronic device, the method comprising:
completing a payment by a user of the electronic device using a payment application;
starting a split payment by the user using the payment application;
based on the split payment being started, transmitting via a communication interface of the electronic device, directly to each of one or more external electronic devices, a signal requesting electronic serial number identification information of the each of the one or more external electronic devices, each of users of the one or more external electronic devices participating in the split payment;
receiving the electronic serial number identification information directly from the each of the one or more external electronic devices via the communication interface;
based on the electronic serial number identification information being received directly from the each of the one or more external electronic devices, transmitting via the communication interface, to a first server located outside the electronic device, a signal requesting the first server to create one or more separate virtual accounts associated with the electronic serial number identification information of the each of one or more external electronic devices based on a separate split payment amount allocated to the each of the one or more external electronic devices,
wherein the first server transmits a notification regarding the split payment amount allocated to the each of the one or more external electronic devices and respective virtual account information of the one or more separate virtual accounts, to the each of the one or more external electronic devices; and
receiving a deposit from the each of the users of the one or more external electronic devices into a respective one of the one or more separate virtual accounts, up to the split payment amount allocated to the each of the one or more external electronic devices.

9. The control method of claim 8, wherein the payment application is provided by the first server, and
the method further comprises executing the payment application provided by the first server.

10. The control method of claim 8, further comprising transmitting, to the first server, another signal requesting a second server located outside the electronic device to create the one or more separate virtual accounts, based on the electronic serial number identification information of the each of the one or more external electronic devices participating in the split payment and the split payment amount allocated to the each of the one or more external electronic devices.

11. The control method of claim 8, further comprising, based on receiving, from the first server, a notification including an instruction configured to search for an application providing a remittance function or a payment function, displaying, on a display, an execution screen of the application that is previously installed in the electronic device.

12. The control method of claim 8, further comprising, based on receiving, from the first server, a notification including an instruction configured to execute a website providing a remittance function or a payment function, displaying, on a display, the website that is found by the electronic device.

13. A computer program product comprising a non-transitory computer readable recording medium comprising instructions to cause an electronic device to perform operations of:

completing a payment by a user of the electronic device using a payment application;

starting a split payment by the user using the payment application;

based on the split payment being started, transmitting via a communication interface of the electronic device, directly to each of one or more external electronic devices, a signal requesting electronic serial number identification information of the each of the one or more external electronic devices, each of users of the one or more external electronic devices participating in the split payment;

receiving the electronic serial number identification information directly from the each of the one or more external electronic devices via the communication interface;

based on the electronic serial number identification information being received directly from the each of the one or more external electronic devices, transmitting via the communication interface, to a first server located outside the electronic device, a signal requesting the first server to create one or more separate virtual accounts associated with the electronic serial number identification information of the each of one or more external electronic devices based on a separate split payment amount allocated to the each of the one or more external electronic devices, wherein the first server transmits a notification regarding the split payment amount allocated to the each of the one or more external electronic devices and respective virtual account information of the one or more separate virtual accounts, to the each of the one or more external electronic devices; and receive a deposit from the each of the users of the one or more external electronic devices into a respective one of the one or more separate virtual accounts, up to the split payment amount allocated to the each of the one or more external electronic devices.

* * * * *